(12) United States Patent
Mizuno et al.

(10) Patent No.: US 10,632,770 B2
(45) Date of Patent: Apr. 28, 2020

(54) CONVEYANCE DEVICE, CONVEYANCE SYSTEM, AND HEAD CONTROL METHOD

(71) Applicants: Masahiro Mizuno, Kanagawa (JP); Tomoaki Hayashi, Tokyo (JP); Tsuyoshi Nagasu, Kanagawa (JP); Masayuki Sunaoshi, Ibaraki (JP); Mitsunobu Gohda, Kanagawa (JP)

(72) Inventors: Masahiro Mizuno, Kanagawa (JP); Tomoaki Hayashi, Tokyo (JP); Tsuyoshi Nagasu, Kanagawa (JP); Masayuki Sunaoshi, Ibaraki (JP); Mitsunobu Gohda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 129 days.

(21) Appl. No.: 15/897,096

(22) Filed: Feb. 14, 2018

(65) Prior Publication Data
US 2018/0236794 A1 Aug. 23, 2018

(30) Foreign Application Priority Data

Feb. 17, 2017 (JP) ................................. 2017-027481
Feb. 1, 2018 (JP) ................................. 2018-016719

(51) Int. Cl.
*B41J 15/04* (2006.01)
*B41J 11/00* (2006.01)
(Continued)

(52) U.S. Cl.
CPC ......... *B41J 15/048* (2013.01); *B41J 2/04573* (2013.01); *B41J 2/125* (2013.01);
(Continued)

(58) Field of Classification Search
CPC ...... B41J 11/0095; B41J 11/008; B41J 15/04; B41J 29/393; B41J 2/2146; B41J 29/38; B41J 2025/008; B41J 15/048; B41J 2/04573; B41J 2/125; B41J 11/007; B41J 19/205; B41J 25/001; B41J 2025/03;
(Continued)

(56) References Cited

U.S. PATENT DOCUMENTS 8,172,357 B2* 5/2012 Enomoto ............... B41J 25/001
347/19
2002/0081132 A1 6/2002 Miyamoto et al.
(Continued)

FOREIGN PATENT DOCUMENTS

JP 2012-080346 4/2012
JP 2015-064324 4/2015

*Primary Examiner* — Jannelle M Lebron
(74) *Attorney, Agent, or Firm* — Duft & Bornsen, PC

(57) ABSTRACT

A conveyance device includes a conveyor to convey a conveyed object, a head unit to perform an operation on the conveyed object, a sensor to obtain surface data of the conveyed object, provided for each head unit, and at least one processor. The processor is configured to calculate a first detection result including at least one of a position, a speed of movement, and an amount of movement of the conveyed object based on the surface data, set a detection area based on the first detection result, calculate a second detection result using the detection area according to the first detection result. The processor is further configured to control operation of the at least one head unit based on the second detection result.

18 Claims, 25 Drawing Sheets

(51) Int. Cl.
*B41J 2/045* (2006.01)
*G01N 21/86* (2006.01)
*B41J 2/125* (2006.01)
*B65H 5/02* (2006.01)
*B65H 20/02* (2006.01)
*G01N 21/89* (2006.01)
*B41J 19/20* (2006.01)
*B41J 29/38* (2006.01)
*B41J 2/21* (2006.01)
*B41J 25/00* (2006.01)

(52) U.S. Cl.
CPC ............ *B41J 2/2146* (2013.01); *B41J 11/007* (2013.01); *B41J 11/0095* (2013.01); *B41J 19/205* (2013.01); *B41J 25/001* (2013.01); *B41J 29/38* (2013.01); *B65H 5/026* (2013.01); *B65H 20/02* (2013.01); *G01N 21/86* (2013.01); *G01N 21/8903* (2013.01); *B41J 2025/008* (2013.01); *B65H 2801/03* (2013.01); *G01N 2021/8636* (2013.01)

(58) Field of Classification Search
CPC .... B65H 5/026; B65H 20/02; B65H 2801/03; G01N 21/86; G01N 21/8903; G01N 2021/8636
See application file for complete search history.

(56) References Cited

U.S. PATENT DOCUMENTS

| | | |
|---|---|---|
| 2002/0131804 A1 | 9/2002 | Nakazawa et al. |
| 2003/0039496 A1 | 2/2003 | Miyamoto et al. |
| 2005/0174379 A1 | 8/2005 | Nakazawa et al. |
| 2010/0310284 A1 | 12/2010 | Funato et al. |
| 2014/0044460 A1 | 2/2014 | Kudo et al. |
| 2014/0219670 A1 | 8/2014 | Masuda et al. |
| 2014/0268180 A1 | 9/2014 | Takaura et al. |
| 2015/0009262 A1 | 1/2015 | Bell et al. |
| 2016/0031209 A1* | 2/2016 | Morizono ............ B41J 2/04573 347/9 |
| 2016/0075157 A1 | 3/2016 | Morinaga et al. |
| 2016/0114576 A1 | 4/2016 | Tobita |
| 2016/0121602 A1 | 5/2016 | Nagasu et al. |
| 2016/0136947 A1 | 5/2016 | Hommi |
| 2016/0347050 A1 | 12/2016 | Hommi |
| 2017/0106647 A1 | 4/2017 | Inoue |
| 2017/0165960 A1 | 6/2017 | Sunaoshi et al. |
| 2017/0165961 A1 | 6/2017 | Hayashi et al. |
| 2017/0182764 A1 | 6/2017 | Nagasu et al. |
| 2017/0266954 A1 | 9/2017 | Nagasu et al. |
| 2017/0266965 A1 | 9/2017 | Gohda et al. |
| 2017/0348969 A1 | 12/2017 | Chiba |
| 2017/0355205 A1 | 12/2017 | Tobita et al. |

* cited by examiner

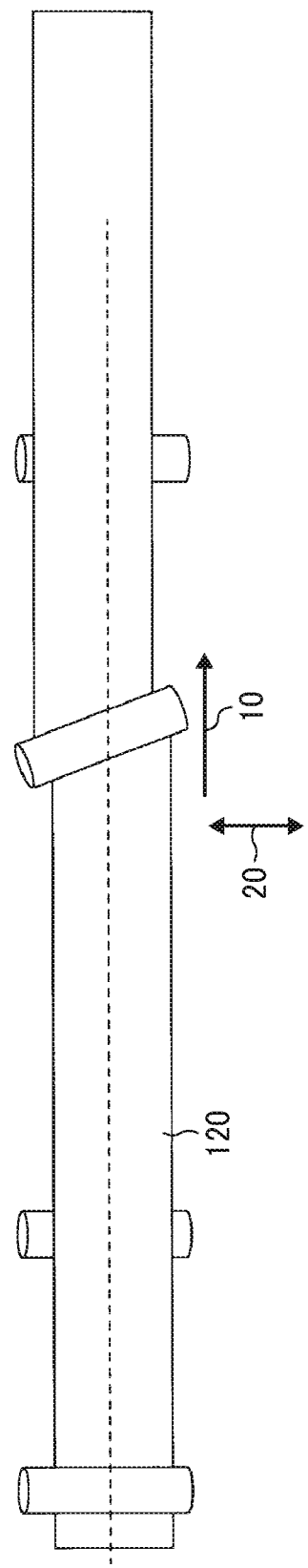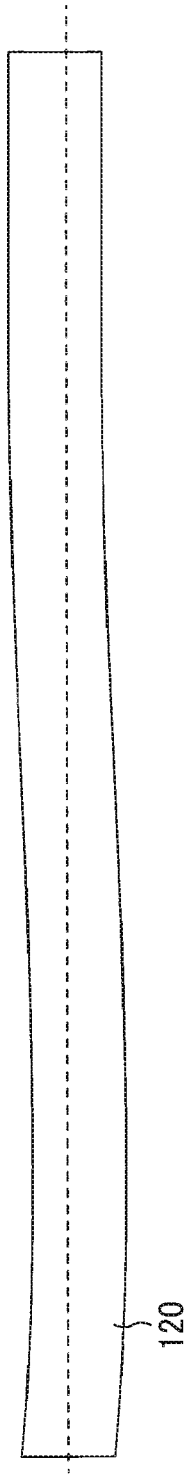

CONVEYANCE DEVICE, CONVEYANCE SYSTEM, AND HEAD CONTROL METHOD

CROSS-REFERENCE TO RELATED APPLICATIONS

This patent application is based on and claims priority pursuant to 35 U.S.C. § 119(a) to Japanese Patent Application Nos. 2017-027481, filed on Feb. 17, 2017, and 2018-016719, filed on Feb. 1, 2018, in the Japan Patent Office, the entire disclosure of each of which is hereby incorporated by reference herein.

BACKGROUND

Technical Field

This disclosure relates to a conveyance device, a conveyance system, and a head controlling method.

Description of the Related Art

There are various types of operation using a head. For example, there are image forming methods that include discharging ink from a print head (so-called inkjet method). In an apparatus including a head to perform an operation on an object being convened (i.e., a conveyed object), if the timing of the operation is improper or the position of the conveyed object deviates from a reference position, the outcome of the operation may include a deviation or misalignment.

SUMMARY

According to an embodiment of this disclosure, a conveyance device includes a conveyor to convey a conveyed object in a conveyance direction, at least one head unit to perform an operation on the conveyed object, a sensor to obtain surface data of the conveyed object, provided for each head unit, and at least one processor configured as follows. The processor is configured to calculate a detection result including at least one of a position, a speed of movement, and an amount of movement of the conveyed object based on the surface data obtained by the sensor; and set a detection area used in calculation of the detection, based on the detection result. The detection result includes a first detection result calculated using the detection area according to initial setting, and a second detection result calculated using the detection area according to the first detection result. The processor is further configured to control operation of the head unit based on the second detection result.

According to another embodiment, a conveyance system includes a plurality of conveyance devices. Each of the plurality of conveyance devices includes a conveyor to convey a conveyed object in a conveyance direction, at least one head unit to perform an operation on the conveyed object, and a sensor to obtain surface data of the conveyed object, the sensor provided for each head unit. The conveyance system further includes at least one processor configured to calculate a detection result including at least one of a position, a speed of movement, and an amount of movement of the conveyed object based on the surface data obtained by the sensor; and set a detection area used in calculation of the detection result, based on the detection result. The detection result includes a first detection result calculated using the detection area according to initial setting, and a second detection result calculated using the detection area according to the first detection result. The processor is further configured to control operation of at least one head unit based on the second detection result.

Yet another embodiment provides a method for controlling a head unit to perform an operation on a conveyed object. The method includes obtaining surface data of the conveyed object; and calculating a first detection result including at least one of a position, a speed of movement, and an amount of movement of the conveyed object based on the surface data. The first detection result is calculated using a detection area according to initial setting. The method further includes setting, based on the first detection result, a detection area used to calculate a second detection result including at least one of the position, the speed of movement, and the amount of movement of the conveyed object; calculating the second detection result using the detection area according to the first detection result; and controlling operation of the head unit based on the second detection result.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 12A and 12B are plan view of a recording medium being conveyed;

Figure 1:
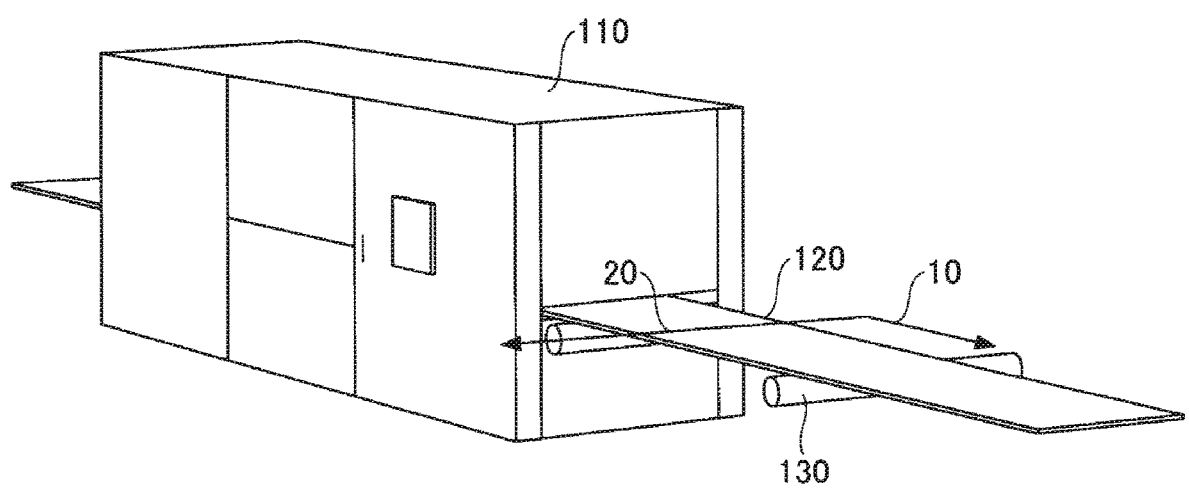
FIG. 1 is a schematic view of a liquid discharge apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an embodiment of this disclosure is described. As used herein, the singular forms "a", "an", and "the" are intended to include the plural forms as well, unless the context clearly indicates otherwise.

The suffixes Y, M, C, and K attached to each reference numeral indicate only that components indicated thereby are used for forming yellow, magenta, cyan, and black images, respectively, and hereinafter may be omitted when color discrimination is not necessary.

General Configuration

Descriptions are given below of an embodiment in which a head unit of a conveyance device is a liquid discharge head unit, and an operation position is a position at which the liquid discharge head unit discharges liquid onto a web (a recording medium). When the head unit of the conveyance device is a liquid discharge head unit to discharge liquid, the conveyance device is a liquid discharge apparatus.

FIG. 1 is a schematic view of a liquid discharge apparatus according to an embodiment, which discharges recording liquid such as aqueous ink or oil-based ink. Descriptions of embodiments are given below using an image forming apparatus as an example of the liquid discharge apparatus.

A liquid discharge apparatus 110 illustrated in FIG. 1 conveys a conveyed object such as a web 120. In the illustrated example, the liquid discharge apparatus 110 includes a roller 130 and the like to convey the web 120, and discharges liquid onto the web 120 to form an image thereon. When an image is formed on the web 120 (i.e., a conveyed object), the web 120 is considered as a recording medium. The web 120 is a so-called continuous sheet. That is, the web 120 is, for example, a rolled sheet to be reeled.

For example, the liquid discharge apparatus 110 is a so-called production printer. The description below concerns an example in which the roller 130 adjusts the tension of the web 120 and conveys the web 120 in a conveyance direction 10. Hereinafter, unless otherwise specified, "upstream" and "downstream" mean those in the conveyance direction 10. A direction orthogonal to the conveyance direction 10 is referred to as an orthogonal direction 20 (e.g., a width direction of the web 120). In the illustrated example, the liquid discharge apparatus 110 is an inkjet printer to discharge four color inks, namely, black (K), cyan (C), magenta (M), and yellow (Y) inks, to form an image on the web 120.

Figure 2:
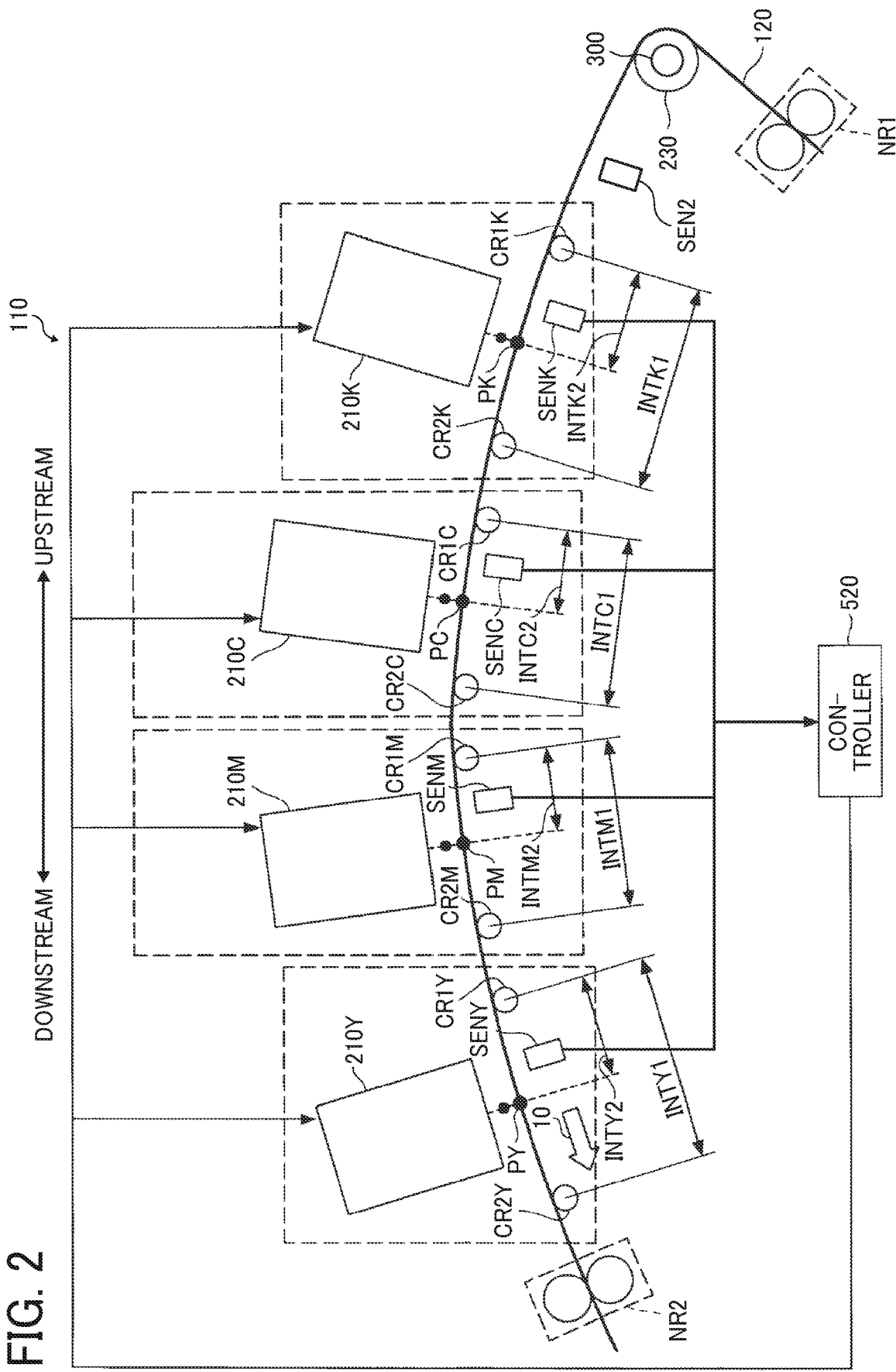
FIG. 2 is a schematic view illustrating a general structure of the liquid discharge apparatus illustrated in FIG. 1.

FIG. 2 is a schematic view illustrating a general structure of a liquid discharge apparatus according to an embodiment. As illustrated in FIG. 2, the liquid discharge apparatus 110 includes four liquid discharge head units 210 (210Y, 210M, 210C, and 210K) to discharge the four inks, respectively.

Each liquid discharge head unit 210 discharges the ink onto the web 120 conveyed in the conveyance direction 10. The liquid discharge apparatus 110 includes two pairs of nip rollers, a roller 230, and the like, to convey the web 120. One of the two pairs of nip rollers is a first nip roller pair NR1 disposed upstream from the liquid discharge head units 210 in the conveyance direction 10. The other is a second nip roller pair NR2 disposed downstream from the first nip roller pair NR1 and the liquid discharge head units 210 in the conveyance direction 10. Each nip roller pair rotates while nipping the conveyed object, such as the web 120, as illustrated in FIG. 2. The nip roller pairs and the roller 230 together serve as a conveyor to convey the conveyed object (e.g., the web 120) in a predetermined direction.

The recording medium such as the web 120 is preferably a long sheet. Specifically, the recording medium is preferably longer than the distance between the first nip roller pair NR1 and the second nip roller pair NR2. The recording medium is not limited to webs. For example, the recording medium can be a folded sheet (so-called fanfold paper or Z-fold paper).

In the structure illustrated in FIG. 2, the liquid discharge head units are arranged in the order of black, cyan, magenta, and yellow in the conveyance direction 10. Specifically, a liquid discharge head unit 210K for black is disposed extreme upstream, and a liquid discharge head unit 210C for cyan is disposed next to the liquid discharge head unit 210K. Further, the liquid discharge head unit 210M for magenta is disposed next to the liquid discharge head unit 210C for cyan, and the liquid discharge head unit 210Y for yellow is disposed extreme downstream in the conveyance direction 10.

Each liquid discharge head unit 210 discharges the ink to a predetermined position on the web 120, according to image data. The position at which the liquid discharge head unit 210 discharges ink (hereinafter "ink discharge position") is almost identical to the position at which the ink discharged from the liquid discharge head (e.g., 210K-1, 210K-2, 210K-3, or 210K-4 in FIG. 5A) lands on the recording medium (hereinafter "landing position"). In other words, the ink discharge position can be directly (or almost directly) below the liquid discharge head unit. In the description below, the ink discharge position serves as an operation position of the liquid discharge head unit.

In the present embodiment, black ink is discharged to the ink discharge position of the liquid discharge head unit 210K (hereinafter "black ink discharge position PK"). Similarly, cyan ink is discharged at the ink discharge position of the liquid discharge head unit 210C (hereinafter "cyan ink discharge position PC"). Magenta ink is discharged at the ink discharge position of the liquid discharge head unit 210M (hereinafter "magenta ink discharge position PM"). Yellow ink is discharged at the ink discharge position of the liquid discharge head unit 210Y (hereinafter "yellow ink discharge position PY"). Note that, for example, a controller 520 operably connected to the liquid discharge head units 210 controls the respective timings of ink discharge of the liquid discharge head units 210 and actuators AC1, AC2, AC3, and AC4 (collectively "actuators AC") illustrated in FIG. 3, to move the liquid discharge head units 210. In one embodiment, the timing control and the actuator control is performed by two or more controllers (or control circuits). The actuators AC serve as head moving devices and are described later.

In the illustrated structure, each liquid discharge head unit 210 is provided with a plurality of rollers. As illustrated in the drawings, the plurality of rollers includes, for example, the rollers respectively disposed upstream and downstream from each liquid discharge head unit 210. Specifically, each liquid discharge head unit 210 is provided with one roller (i.e., a first roller) to support the web 120, disposed upstream from the ink discharge position and another roller (i.e., a second roller) to support the web 120, disposed downstream from the ink discharge position, in the conveyance passage along which the web 120 is conveyed.

Disposing the first roller and the second roller for each ink discharge position can suppress fluttering of the recording medium conveyed. For example, the first roller and the second roller are driven rollers. Alternatively, the first roller and the second roller may be driven by a motor or the like.

Note that, instead of the first and second rollers that are rotators such as driven rollers, first and second supports that are not rotatable to support the conveyed object can be used. For example, each of the first and second supports can be a pipe or a shaft having a round cross section. Alternatively, each of the first and second supports can be a curved plate having an arc-shaped face to contact the conveyed object. In the description below, the first and second supporters are rollers.

Specifically, a first roller CR1K is disposed upstream from the black ink discharge position PK in the conveyance direction 10 in which the web 120 is conveyed. A second roller CR2K is disposed downstream from the black ink discharge position PK in the conveyance direction 10.

Similarly, a first roller CR1C and a second roller CR2C are disposed upstream and downstream from the liquid discharge head unit 210C for cyan, respectively. Similarly, a first roller CR1M and a second roller CR2M are disposed upstream and downstream from the liquid discharge head unit 210M, respectively. Similarly, a first roller CR1Y and a second roller CR2Y are disposed upstream and downstream from the liquid discharge head unit 210Y, respectively.

The liquid discharge apparatus 110 includes, for example, sensor devices (e.g., sensor devices SENK, SENC, SENM, and SENY, also collectively "first sensor devices SEN") for the liquid discharge head units, respectively, as illustrated in FIG. 2. The term "sensor device" in this specification means a group of components including a sensor. The liquid discharge apparatus 110 can further include another sensor device (i.e., a second sensor device SEN2) upstream from the first sensor devices SEN in the conveyance direction 10. That is, the second sensor device SEN2 is the extreme upstream one of the sensor devices when the second sensor device SEN2 is provided.

In the example illustrated in FIG. 2, the liquid discharge apparatus 110 includes four first sensor devices SEN and one second sensor device SEN2, that is, five sensor devices in total.

In the description below, the first sensor devices SEN and the second sensor device SEN2 may be collectively referred to as sensor devices, and the optical sensors (area sensors) of the first sensor devices and the second sensor device may be referred to as first sensors and a second sensor or collectively sensors. The structures and locations of the sensor devices are not limited to those illustrated in the drawings.

Although the number of the sensor devices is five in the description below, the number of the sensor devices is not limited to five. The number of the first and second sensor devices in total can be greater than the number of the liquid discharge head units as illustrated in FIG. 2. For example, each liquid discharge head unit 210 can be provided with two or greater number of sensor devices. Similarly, two second sensor devices SEN2 can be used. Alternatively, the second sensor device SEN2 can be omitted.

For example, the sensor device SEN includes an optical sensor OS (illustrated in FIG. 7) employing visible light, laser light, infrared, or the like. Note that the optical sensor OS can be is a charge-coupled device (CCD) camera or a complementary metal oxide semiconductor (CMOS) camera. That is, the sensor device SEN includes a sensor to detect surface data of the web 120. The liquid discharge apparatus 110 detects, with the sensor device SEN, the surface data of the conveyed object during image formation and detects at least one of the relative position, speed of movement, and the amount of movement of the conveyed object among a plurality of detection results. Note that the sensor devices can be of same type or different types. In the description below, the sensor devices are of same type.

As described later, the sensor device includes a laser light source (hereinafter "light source LG"). As the laser light emitted from the light source LG is diffused on the surface of the web 120 and superimposed diffusion waves interfere with each other, a pattern such as a speckle pattern is generated. The optical sensor OS of the sensor device SEN captures and images the pattern such as the speckle pattern. The speckle pattern is an example of surface data of the web 120. Based on the change of position of the pattern captured by the optical sensor OS, the sensor device SEN can detect at least one of the relative position, speed of movement, and the amount of movement of the conveyed object. Then, the liquid discharge apparatus 110 can obtain the amount by which the liquid discharge head unit 210 is to be moved, the timing of ink discharge from the liquid discharge head unit 210, or the like.

Further, the term "location of sensor device" means the position regarding which the sensor device SEN performs detection (e.g., position detection), that is, the position to be detected by the sensor device. Accordingly, it is not necessary that all components relating to the detection are disposed at the "location of sensor device". In one embodiment, only the optical sensor OS is disposed at the position where the sensor device SEN performs detection, and other components are coupled to the optical sensor OS via a cable and disposed away therefrom. By contrast, in another embodiment, all components relating to the detection are disposed at the "location of sensor device". In FIG. 2, references "SENK, SENC, SENM, SENY, and SEN2" are given at respective example locations of sensor devices in the liquid discharge apparatus 110. In the description below, the sensor devices SENK, SENC, SENM, SENY, and SEN may be collectively referred to as "sensor devices".

The optical sensor OS is preferably disposed close to the ink discharge position. That is, the distance between the ink discharge position and the sensor device SEN is preferably short. When the distance between the ink discharge position and the first sensor device SEN is short, detection error can be suppressed. Accordingly, the liquid discharge apparatus 110 can accurately detect, with the first sensor device SEN, the position of the recording medium in the conveyance direction 10 or the orthogonal direction 20.

Referring back to FIG. 2, in the description below, the sensor device SEN provided for the liquid discharge head unit 210K for black is referred to as "sensor device SENK". Similarly, the sensor device SEN provided for the liquid discharge head unit 210C for cyan is referred to as "sensor device SENC". The sensor device provided for the liquid discharge head unit 210M for magenta is referred to as "sensor device SENM". The sensor device provided for the liquid discharge head unit 210Y for yellow is referred to as "sensor device SENY".

Specifically, the sensor device SEN is disposed between the first roller CR1 and the second roller CR2. In the illustrative embodiment, the sensor device SENK for black is preferably disposed in an inter-roller range INTK1 between the first and second rollers CR1K and CR2K. Similarly, the sensor device SENC for cyan is preferably disposed in an inter-roller range INTC1 between the first and second rollers CR1C and CR2C. The sensor device SENM for magenta is preferably disposed in an inter-roller range INTM1 between the first and second rollers CR1M and CR2M. The sensor device SENY for yellow is preferably disposed in an inter-roller range INTY1 between the first and second rollers CR1Y and CR2Y. The inter-roller ranges INTY1, INTC1, INTM1, and INTY1 are collectively referred to as "inter-roller ranges INT1". The first sensor device SEN disposed between the first and second rollers CR1 and CR2 can detect the recording medium at a position close to the ink discharge position. Further, since the moving speed is relatively stable in a portion between the rollers, the liquid discharge apparatus 110 can detect the position of the recording medium in the orthogonal direction 20, with a high accuracy.

More preferably, in each inter-roller ranges INT1, the first sensor device SEN is disposed between the ink discharge position and the first roller CR1. In other words, the first sensor device SEN is preferably disposed upstream from the ink discharge position in the conveyance direction 10.

Specifically, the sensor device SENK for black is, more preferably, disposed in a range extending between the black ink discharge position PK and the first roller CR1K for black (hereinafter "upstream range INTK2"). Similarly, the sensor device SENC for cyan is, more preferably, disposed in a range extending between the cyan ink discharge position PC and the first roller CR1C for cyan (hereinafter "upstream range INTC2"). The sensor device SENM for magenta is, more preferably, disposed in a range extending between the magenta ink discharge position PM and the first roller CR1M for magenta (hereinafter "upstream range INTM2"). The sensor device SENY for yellow is, more preferably, disposed in a range extending between the yellow ink discharge position PY and the first roller CR1Y for yellow (hereinafter "upstream range INTY2").

When the first sensor devices SEN are respectively disposed in the upstream ranges INTK2, INTC2, INTM2, and INTY2, the liquid discharge apparatus 110 can detect the position of the recording medium (conveyed object) in the orthogonal direction 20, with a high accuracy. The first sensor devices SEN thus disposed are upstream from the landing position at which ink droplets land on the recording medium in the conveyance direction 10. Accordingly, the liquid discharge apparatus 110 can initially detect the position of the recording medium with the first sensor device SEN high a high accuracy and then calculate the ink discharge timing (i.e., operation timing) of each liquid discharge head unit 210, the amount by which each liquid discharge head unit 210 is to move, or a combination thereof.

In other words, in a period from when the position of a given portion of the web 120 (conveyed object) is detected on the upstream side of the ink landing position to when the detected portion of the web 120 reaches the ink landing position, adjustment of the timing to discharge the liquid, moving of the liquid discharge head unit 210, or the combination thereof can be performed. Accordingly, the liquid discharge head unit 210 can accurately change the landing position in at least one of the conveyance direction 10 and the orthogonal direction 20.

Note that, if the first sensor device SEN is disposed directly below the liquid discharge head unit 210, in some cases, a delay of control action causes misalignment in color superimposition (out of color registration) resulting in color shift. Accordingly, when the location of sensor device is upstream from the ink landing position, misalignment in color superimposition is suppressed, improving image quality. There are cases where layout constraints hinder disposing the first sensor device SEN adjacent to the landing position. Accordingly, the first sensor device SEN is preferably disposed closer to the first roller CR1 from the ink landing position.

The location of sensor device can be directly below the liquid discharge head unit 210. The sensor device SEN disposed directly below the head unit can accurately detect the amount of movement of the recording medium directly below the head unit. Therefore, in a configuration in which the speed of control action is relatively fast, the sensor device is preferably disposed closer to the position directly below the liquid discharge head unit 210. However, the location of sensor device is not limited to a position directly below the liquid discharge head unit 210, and similar calculation is feasible when the sensor device is disposed otherwise.

Alternatively, in a configuration in which error is tolerable, the sensor device can be disposed directly below the liquid discharge head unit, or between the first and second rollers and downstream from the position directly below the liquid discharge head unit.

In an arrangement in which the first sensor devices SEN are evenly spaced, the second sensor device SEN2 is preferably spaced similarly. The description below is based on the arrangement illustrated in FIG. 2. Specifically, there are cases where the first sensor devices SEN are evenly spaced. That is, a distance between the sensor device SENK and the sensor device SENC, a distance between the sensor device SENC and the sensor device SENM, and a distance between the sensor device SENM and the sensor device SENY are similar. In this arrangement, the second sensor device SEN2 is preferably disposed so that a distance between the second sensor device SEN2 and the sensor device SENK is similar to a distance between the sensor device SENK and the sensor device SENC. The accuracy of detection by the sensor devices is generally calculated based on the distance between the sensor devices. Accordingly, disposing the sensor devices at equal distances is advantageous in equalizing the accuracy of detection.

Additionally, the location of the second sensor device is preferably downstream from a roller around which the conveyed object twines. For example, if the web 120 twines or winds around the roller, the position of the web 120 easily changes. Accordingly, it is preferable to detect the web 120 with the second sensor device after such twining occurs, that is, downstream from the position where such twining occurs. This placement can reduce the adverse effect of the twining with the detection result of the second sensor device. Note that, in the example illustrated in FIG. 2, the web 120 may twine the roller 230. If the web 120 is looped around a roller at a relatively sharp angle as illustrated, the web 120 may twine the roller and fluctuate in position. Accordingly, in the example illustrated in FIG. 2, the second sensor device SEN2 is preferably disposed downstream from the roller 230.

Figure 3:
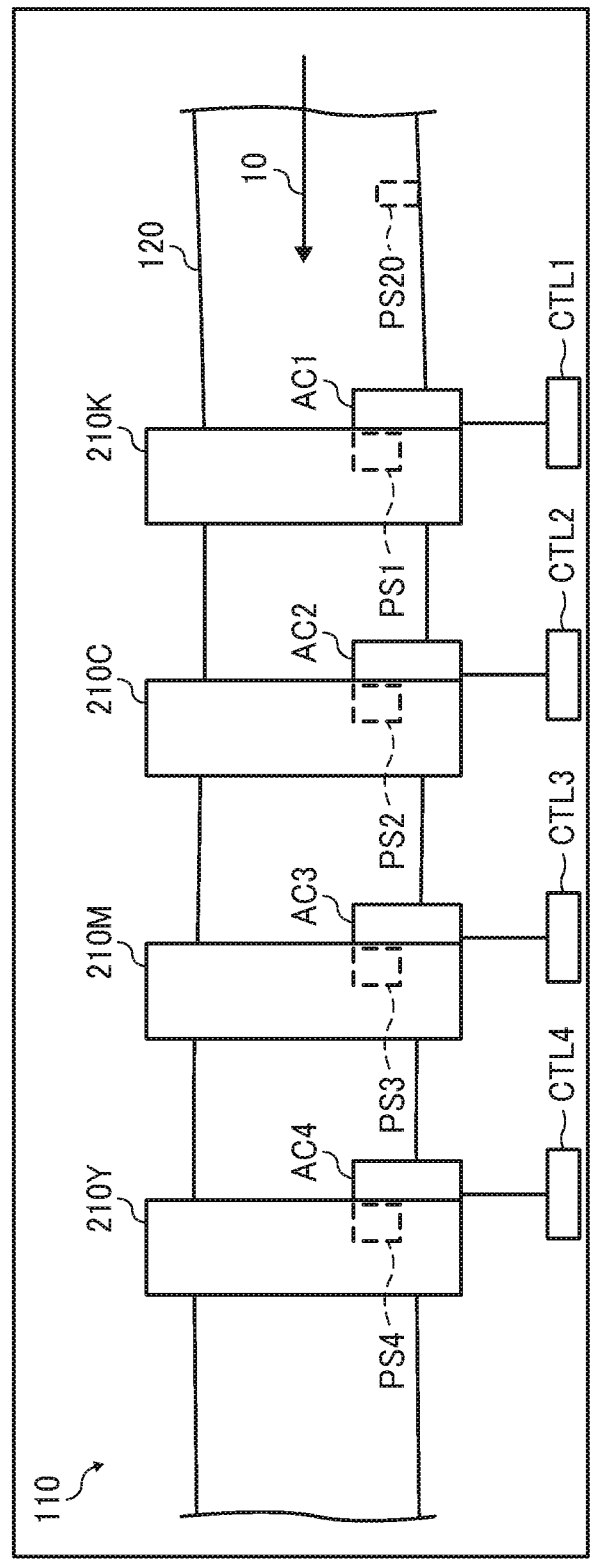
FIG. 3 is a schematic view illustrating an example structure of the liquid discharge apparatus illustrated in FIG. 1.

FIG. 3 is a schematic plan view illustrating an arrangement of the sensor devices SEN and the actuators AC of the liquid discharge apparatus illustrated in FIG. 3. Referring to FIG. 2, when viewed in the direction vertical to the recording surface of the web 120, for example, the sensor device SEN is preferably disposed at a position close to an end of the web 120 in the width direction (the orthogonal direction 20) of the web 120 and overlapping with the web 120. The sensor devices SEN are disposed at positions PS1, PS2, PS3, PS4, and PS20 in FIG. 3, respectively. In the configuration illustrated in FIGS. 2 and 3, the controller 520 can control the actuators AC1, AC2, AC3, and AC4 to move the liquid discharge head units 210Y, 210M, 210C, and 210K, respectively, in both the conveyance direction 10 in which the web 120 is conveyed and the orthogonal direction 20 orthogonal thereto.

In the configuration illustrated in FIG. 2, the sensor devices SEN are disposed facing a back side (lower side in FIG. 2) of the web 120 opposite the liquid discharge head units 210.

To the actuators AC1, AC2, AC3, and AC4, actuator controllers CTL1, CTL2, CTL3, and CTL4 are connected to control the actuators AC1, AC2, AC3, and AC4, respectively.

The actuator ACT is, for example, a linear actuator or a motor. The actuator can include a control circuit, a power circuit, and a mechanical component.

For example, the actuator controller CTL1, CTL2, CTL3, and CTL4 (hereinafter collectively "actuator controllers CTL") include driver circuits.

Figure 4:
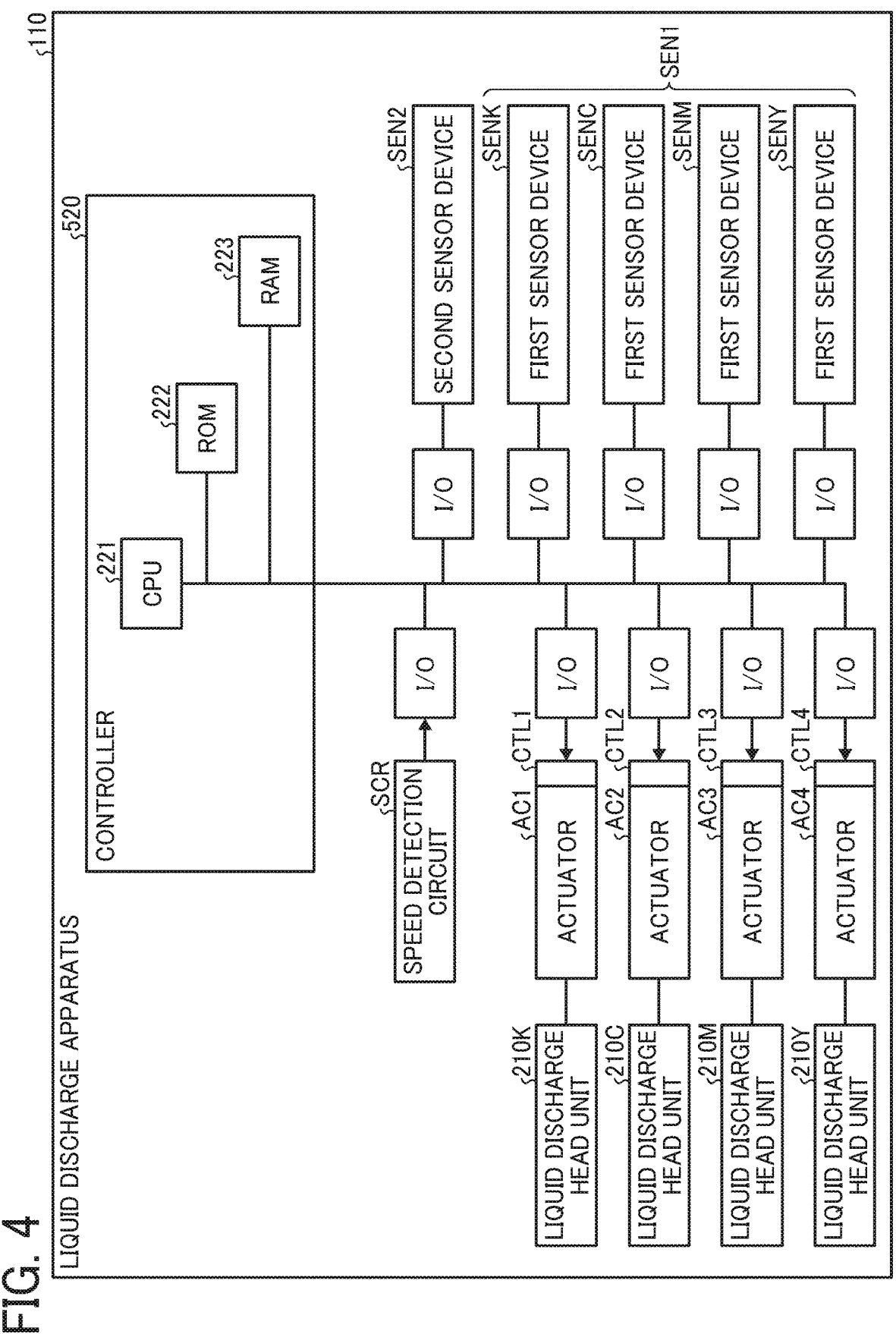
FIG. 4 is a block diagram of a hardware configuration to calculate displacement of a conveyed object, according to an embodiment.

FIG. 4 is a block diagram of a hardware configuration to calculate displacement of the conveyed object, according to the present embodiment. In the illustrated example, the liquid discharge apparatus 110 includes a plurality of actuators and a plurality of sensor devices. In the illustrated example, the controller 520 is mounted in the liquid discharge apparatus 110. The controller 520 includes a central processing unit (CPU) 221, a read only memory (ROM) 222, and a random access memory (RAM) 223. As illustrated in the drawing, each device, such as the first sensor devices SENK, SENC, SENM, and SENY (also collectively "first sensor devices SEN1"), the second sensor device SEN2, and the actuators AC1, AC2, AC3, and AC4, can further include an input/output (I/O) interface for data transmission and reception with another device.

Note that the configuration is not limited to the illustrated configuration. That is, the illustrated devices can be components of either the liquid discharge apparatus 110 or an external apparatus.

Some of the illustrated components may be shared by two or more devices. For example, the CPU 221 can double as a CPU to implement a detecting unit to be described later.

The CPU 221 is examples of the processor and the controller. Specifically, the CPU 221 acquires detection results generated by the sensors and performs operation to calculate the displacement of the conveyed object. Further, the CPU 221 controls the actuators AC to move the liquid discharge head units 210.

The ROM 222 and the RAM 223 are examples of memories. For example, the ROM 222 stores programs and data used by the CPU 221. Additionally, the RAM 223 stores the program for the operation performed by the CPU 221 and serves as a memory region to implement the operation.

A speed detection circuit SCR is an electronic circuit to detect, for example, the speed at which the conveyed object is conveyed. Note that the speed detection circuit SCR can be either identical to or different from the processor such as the CPU 221.

Figure 5A:
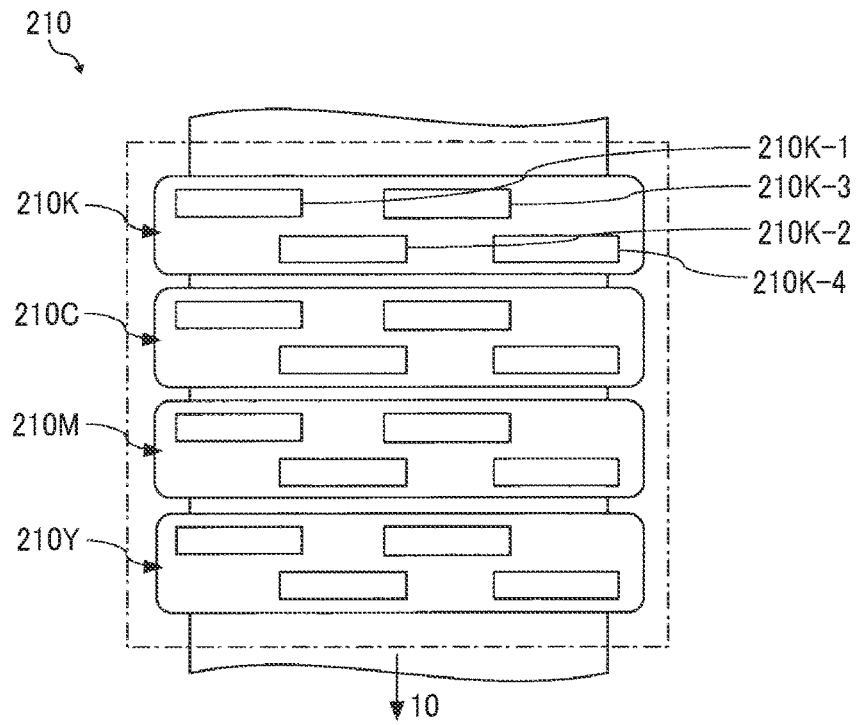
FIGS. 5A and 5B are schematic views of an external shape of a liquid discharge head unit according to an embodiment.
Figure 5B:
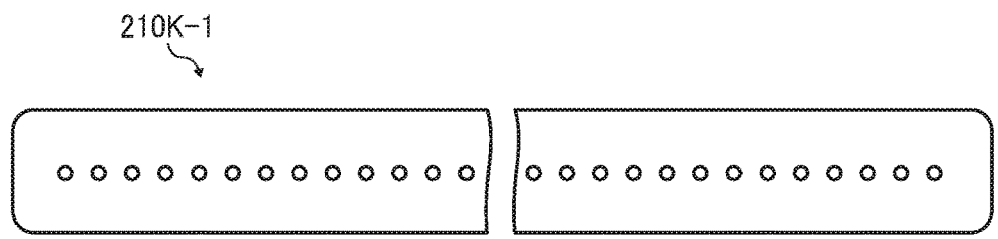

FIGS. 5A and 5B are schematic views illustrating external shapes of the liquid discharge head unit according to the present embodiment. FIG. 5A is a schematic plane view of one of the four liquid discharge head units 210K to 210Y of the liquid discharge apparatus 110.

In the example illustrated in FIG. 5A, the liquid discharge head unit 210 is a line head unit. That is, the liquid discharge apparatus 110 includes the four liquid discharge head units 210K, 210C, 210M, and 210Y arranged in the order of black, cyan, magenta, and yellow in the conveyance direction 10.

In this example, the liquid discharge head unit 210K includes four heads 210K-1, 210K-2, 210K-3, and 210K-4 arranged in a staggered manner in the orthogonal direction 20. With this arrangement, the liquid discharge apparatus 110 can form an image throughout the image formation area on the web 120 in the width direction orthogonal to the conveyance direction 10. The liquid discharge head units 210C, 210M, and 210Y are similar in structure to the liquid discharge head unit 210K, and the descriptions thereof are omitted to avoid redundancy.

Although the description above concerns a liquid discharge head unit including four heads, a liquid discharge head unit including a single head can be used.

Conveyed Object Detector

Figure 6:
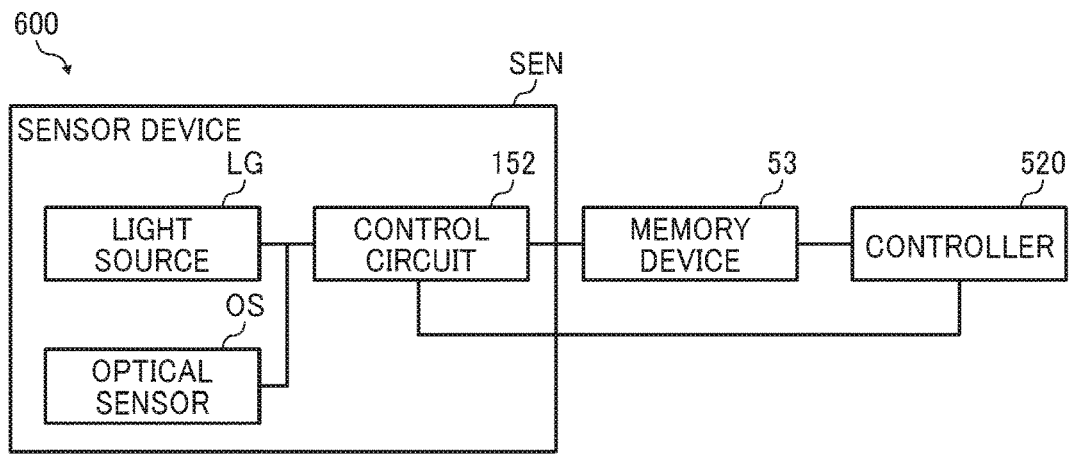
FIG. 6 is a schematic block diagram illustrating a hardware configuration to implement a conveyed object detector according to an embodiment.

FIG. 6 is a schematic block diagram illustrating a hardware configuration to implement a conveyed object detector 600 of the liquid discharge apparatus 110, to detect the conveyed object. For example, the conveyed object detector 600 is implemented by hardware such as the sensor devices SEN and the controller 520, illustrated in the drawing.

The sensor device SEN is described below.

Figure 7:
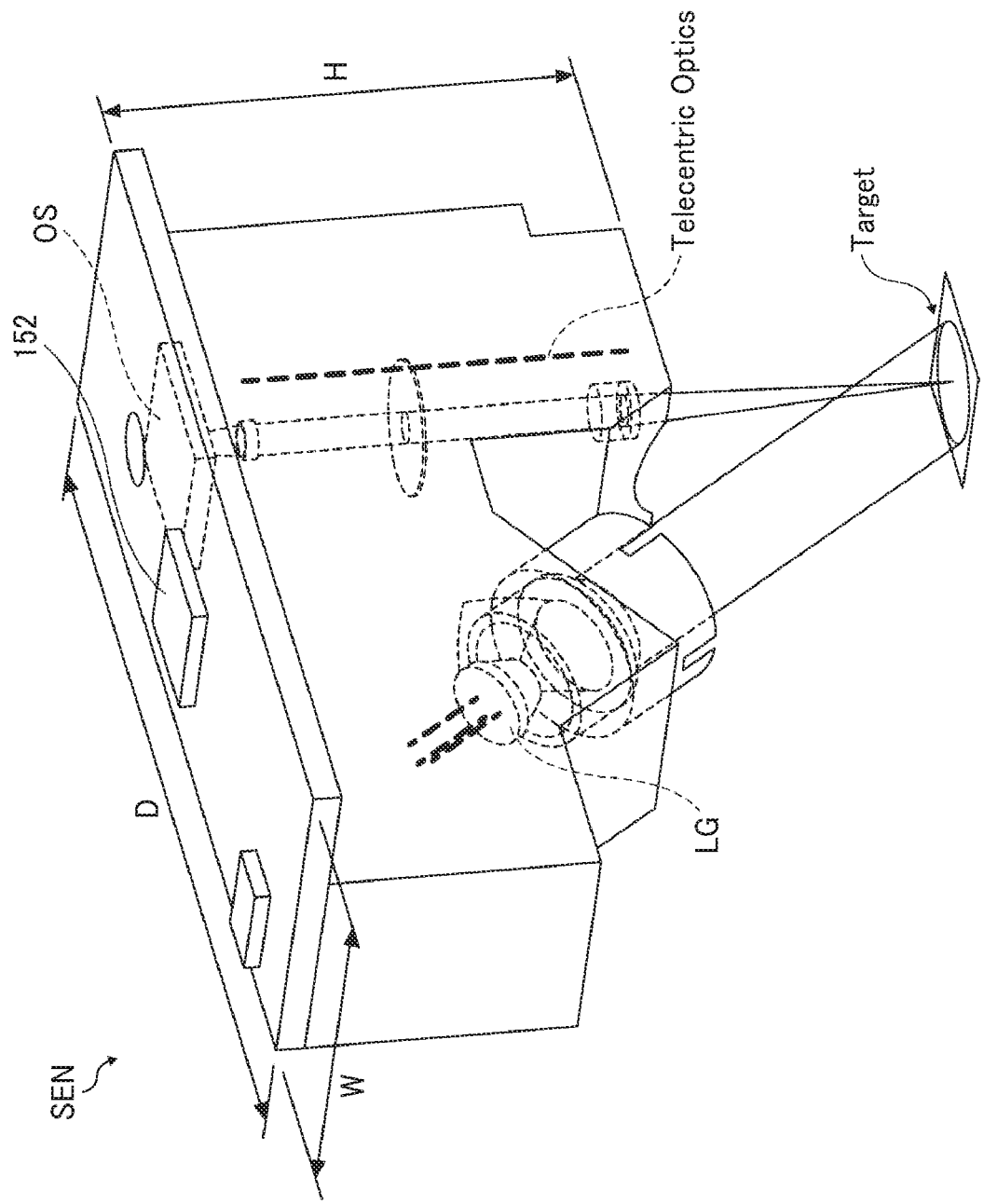
FIG. 7 is an external view of a sensor device included in the conveyed object detector illustrated in FIG. 6.

FIG. 7 is an external view of the sensor device SEN included in the conveyed object detector 600.

The conveyed object detector 600 illustrated in the drawing is configured to irradiated a conveyed object, such as a recording medium (e.g., a web), with light to form a speckle pattern. Specifically, the sensor device SEN includes the light source LG including a plurality of light-emitting parts. To obtain an image of the speckle pattern, the sensor device SEN further includes the optical sensor OS (e.g., a CMOS image sensor) and a telecentric optics (TO) to condense light to image the speckle pattern on the CMOS image sensor.

For example, the optical sensor OS performs imaging of the speckle pattern. Then, the controller 520 performs processing such as correlation operation based on the image obtained by one optical sensor OS and the image obtained by the optical sensor OS of another sensor device SEN. In this case, the controller 520 calculates, for example, the amount of movement of the conveyed object from one optical sensor OS to the other optical sensor OS. Alternatively, the same optical sensor OS can capture an image of the pattern at a time T1 and an image of the pattern at a time T2. Then, correlation operation can be made using the image of the pattern obtained at the time T1 (time point) and the image of the pattern obtained at the time T2 (time point). In this case, the controller 520 outputs the amount of movement from the time T1 to the time T2. Thus, the image obtained at times T1 and T2 serve as the surface data detected at least two different time points. In the illustrated example, the sensor device SEN has a width W of 15 mm, a depth D of 60 mm, and a height H of 32 mm (15×60×32).

The light source is not limited to devices employing laser light but can be, for example, a light emitting diode (LED) or an organic electro luminescence (EL). Depending on the type of light source, the pattern to be detected is not limited to the speckle pattern. Descriptions are given below of an example in which the pattern is a speckle pattern.

The CMOS image sensor is an example hardware structure to implement an imaging unit 16 (16A or 16B) to be described later. Although the controller 520 performs the correlation operation in this example, in one embodiment, a field-programmable gate array (FPGA) circuit of one of the sensor devices SEN performs the correlation operation.

A control circuit 152 controls the optical sensor OS, the light source LG, and the like disposed inside the sensor device SEN. Specifically, the control circuit 152 outputs trigger signals to a detection circuit 50 to control the shutter timing of the optical sensor OS. The control circuit 152 controls the optical sensor OS to acquire the two-dimensional image data therefrom. Then, the control circuit 152 transmits the two-dimensional image data generated by the optical sensor OS to the memory device 53. The control circuit 152 further outputs a signal to designate an irradiated area, to the light source LG. In another embodiment, the control circuit 152 is implemented by the FPGA circuit, for example.

The memory device 53 is a so-called memory. The memory device 53 preferably has a capability to divide the two-dimensional image data transmitted from the control circuit 152 and store the divided image data in different memory ranges.

The controller 520 performs operations using the image data stored in the memory device 53.

The control circuit 152 and the controller 520 are, for example, central processing units (CPUs) or electronic circuits. Note that the control circuit 152, the memory device 53, and the controller 520 are not necessarily different devices. For example, the control circuit 152 and the controller 520 can be implemented by a single CPU.

Figure 8A:
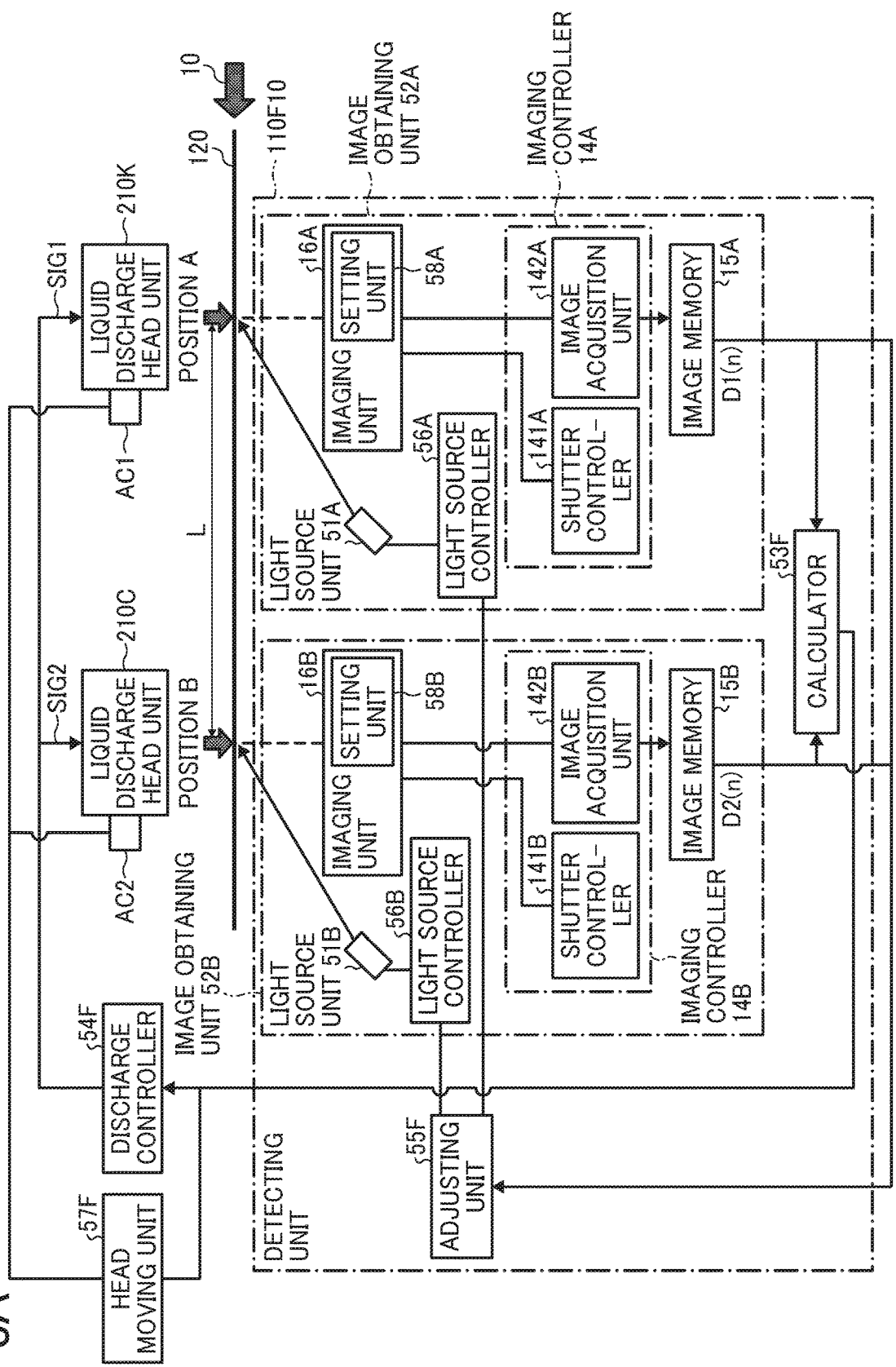
FIGS. 8A and 8B are schematic block diagrams of a functional configuration of the conveyed object detector, according to an embodiment.

FIG. 8A is a functional block diagram of the conveyed object detector 600. Although the sensor devices SEN are respectively provided for the liquid discharge head units 210, in the example described below, a detecting unit 110F10 is implemented by a combination of sensor devices SENK and SENC for the liquid discharge head units 210K and 210C and the conveyed object detector 600 including the controller 520, as illustrated in FIG. 8A. In this example, an image obtaining unit 52A, which is the function of the sensor device SENK to obtain an image, outputs data of imaging at a position A, and an image obtaining unit 52B, which is the function of the sensor device SENC to obtain an image, outputs data of imaging at a position B.

The image obtaining unit 52A for the liquid discharge head unit 210K includes, for example, an imaging unit 16A, an imaging controller 14A, an image memory 15A, and a light source unit 51A, and a light source controller 56A. In this example, the image obtaining unit 52B for the liquid discharge head unit 210C is similar in configuration to the image obtaining unit 52A. The image obtaining unit 52B includes an imaging unit 16B, an imaging controller 14B, and an image memory 15B. The image obtaining unit 52A is described below, and redundant descriptions are omitted.

The imaging unit 16A captures an image of the web 120 conveyed in the conveyance direction 10. The imaging unit 16A is implemented by, for example, the optical sensor OS (illustrated in FIG. 7). The imaging unit 16A includes a setting unit 58A to set the detection area of the sensor device SEN.

Figure 8B:
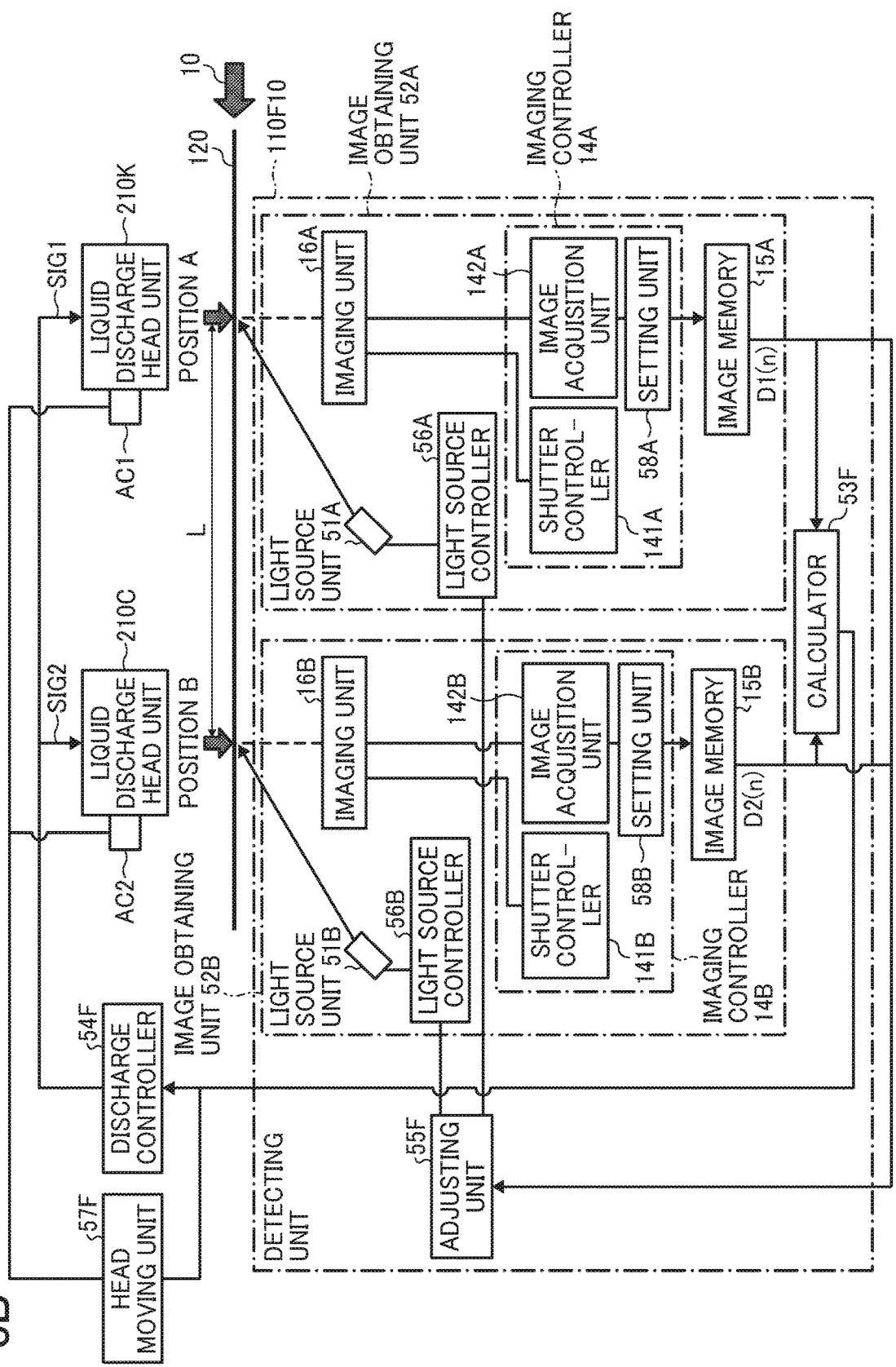

The configuration illustrated in FIG. 8B is different from the configuration illustrated in FIG. 8A only in that the setting units 58A and 58B (hereinafter collectively "setting units 58") are mounted in the imaging controllers 14A and 14B, respectively.

The imaging controller 14A includes a shutter controller 141A and an image acquisition unit 142A. The imaging controller 14A is implemented by, for example, the control circuit 152.

The image acquisition unit 142A acquires the image data generated by the imaging unit 16A.

The shutter controller 141A controls the timing of imaging by the imaging unit 16A.

The image memory 15A stores the image data acquired by the imaging controller 14A. The image memory 15A is implemented by, for example, the memory device 53 and the like (illustrated in FIG. 6).

The light source unit 51A irradiates the web with light such as laser light. The light source unit 51A is implemented by, for example, the light source LG (illustrated in FIG. 7).

The light source controller 56A controls turning on and off and the amount of light of a plurality of light-emitting elements of the light source unit 51A. The light source controller 56A is implemented by, for example, the control circuit 152.

The light source controller 56A is controlled by an adjusting unit 55F. As described later, the adjusting unit 55F controls the light source controller 56A to change the area irradiated by the light source unit 51A (i.e., the irradiated area). The adjusting unit 55F is implemented by, for example, the controller 520.

A calculator 53F is configured to calculate, based on the image data recorded in the image memories 15A and 15B, the position of the pattern on the web 120, the speed at which the web 120 moves (hereinafter "moving speed"), and the amount of movement of the web 120. Additionally, the calculator 53F outputs, to the shutter controllers 141A and 141B, data on time difference Δt indicating the timing of shooting (shutter timing). In other words, the calculator 53F can instruct the shutter controller 141A of shutter timings of imaging at the position A and imaging at the position B with the time difference Δt. The calculator 53F is implemented by, for example, the controller 520 or a processor.

The web 120 has diffusiveness on a surface thereof or in an interior thereof. Accordingly, when the web 120 is irradiated with light (e.g., laser beam) of the light source unit 51A or 51B, the reflected light is diffused. The diffuse reflection creates a pattern on the web 120. The pattern is made of spots called "speckles" (i.e., a speckle pattern). Accordingly, when the web 120 is shot, an image of the speckle pattern is obtained. From the image, the position of the speckle pattern is known, and a relative position of a specific portion of the web 120 can be detected. The speckle pattern is generated as the light emitted to the web 120 interferes with a rugged shape caused by a projection and a recess, on the surface or inside of the web 120.

As the web 120 is conveyed, the speckle pattern on the web 120 is conveyed as well. When an identical speckle pattern is detected at different time points, the calculator 53F obtains the amount of movement of the web 120 based on the detection result. In other words, the calculator 53F obtains the amount of movement of the speckle pattern based on multiple number of times of detection of an identical speckle pattern, thereby obtaining the amount of movement of the web 120. Further, the calculator 53F converts the calculated amount of movement into an amount of movement per unit time, thereby obtain the speed at which the web 120 has moved.

As illustrated in FIG. 8A, the imaging unit 16A and the imaging unit 16B are disposed at a regular interval (given reference "L" in FIG. 8A) from each other in the conveyance direction 10. Via the imaging units 16A and 16B, images of the web 120 are taken at the respective positions.

The shutter controllers 141A and 141B cause the imaging units 16A and 16B to perform imaging of the web 120 at an interval of time difference Δt. Then, based on the pattern represented by the image data generated by the imaging, the calculator 53F obtains the amount of movement of the web 120. The time difference Δt can be expressed by Formula 1 below, where V represents a conveyance speed (mm/s) in an ideal condition without displacement, and L represents a relative distance, which is the distance (mm) between the imaging unit 16A and the imaging unit 16B in the conveyance direction 10.

$$\Delta t = L/V \qquad \text{Formula 1}$$

In Formula 1 above, the relative distance L (mm) between the imaging unit 16A and the imaging unit 16A and is obtained preliminarily.

The calculator 53F performs cross-correlation operation of image data D1(n) generated by the image obtaining unit 52A and image data D2(n) generated by the image obtaining unit 52B. Hereinafter image data generated by the cross-correlation operation is referred to as "correlated image data". For example, based on the correlated image data, the calculator 53F calculates the displacement amount ΔD(n), which is the amount of displacement from the position detected with the previous frame or by another sensor device. For example, the cross-correlation operation is expressed by Formula 2 below.

$$D1*D2* = F-1[F[D1] \cdot F[D2]*] \qquad \text{Formula 2}$$

Note that, the image data D1(n) in Formula 2, that is, the data of the image taken at the position A, is referred to as the image data D1. Similarly, the image data D2(n) in Formula 2, that is, the data of the image taken at the position B, is referred to as the image data D2. In Formula 2, "F[ ]" represents Fourier transform, "F-1[ ]" represents inverse Fourier transform, "*" represents complex conjugate, and "*" represents cross-correlation operation.

As represented in Formula 2, image data representing the correlation image is obtained through cross-correlation operation "D1*D2" performed on the first image data D1 and the second image data D2. Note that, when the first image data D1 and the second image data D2 are two-dimensional image data, the correlated image data is two-dimensional image data. When the first image data D1 and the second image data D2 are one-dimensional image data, the image data representing the correlation image is one-dimensional image data.

Regarding the correlation image, when a broad luminance profile causes an inconvenience, phase only correlation can be used. For example, phase only correlation is expressed by Formula 3 below.

$$D1*D2* = F-1[P[F[D1]] \cdot P[F[D2]*]] \qquad \text{Formula 3}$$

In Formula 3, "P[ ]" represents taking only phase out of complex amplitude, and the amplitude is considered to be "1".

Thus, the calculator 53F can obtain the displacement amount ΔD(n) based on the correlation image even when the luminance profile is relatively broad.

The correlation image represents the correlation between the first image data D1 and the second image data D2. Specifically, as the match rate between the first image data D1 and the second image data D2 increases, a luminance causing a sharp peak (so-called correlation peak) is output at a position close to a center of the correlated image data. When the first image data D1 matches the second image data D2, the center of the correlation image and the peak position overlap.

Based on the correlation operation, the calculator 53F outputs the displacement in position, the amount of movement, or the speed of movement between the first image data D1 and the second image data D2 obtained at the time difference Δt. For example, the conveyed object detector 600 detects the amount by which the web 120 has moved in the orthogonal direction 20 from the position of the first image data D1 to the position of the second image data D2. Alternatively, the result of correlation operation can be the speed of movement instead of the amount of movement. Thus, the calculator 53F can calculate the amount of movement of the liquid discharge head unit 210C for cyan based on the result of the correlation operation.

Based on the calculation result generated by the calculator 53F, a head moving unit 57F controls the actuator AC2 illustrated in FIG. 3, thereby controlling the landing position of the liquid. The head moving unit 57F is implemented by, for example, the actuator controller CTL. Alternatively, the head moving unit 57F can be implemented by a combination of the actuator controller CTL and the controller 520. Yet alternatively, the head moving unit 57F can be implemented by the controller 520.

Further, based on the result of correlation operation, the calculator 53F can obtain the difference between the conveyance amount of the web 120 in the conveyance direction 10 and the relative distance L. That is, the calculator 53F can be also used to calculate the positions of the web 120 in both of the conveyance direction 10 and the orthogonal direction 20, based on the two-dimensional (2D) image data generated by the imaging units 16A and 16B. Sharing the sensor device in detecting positions in both directions can reduce the cost of the sensor devices. Additionally, the space for the detection can be small since the number of sensor devices is reduced.

Based on the calculated difference of the conveyance amount of the web 120 from an ideal distance, the calculator 53F calculates the timing of ink discharge from the liquid discharge head unit 210C for cyan. Based on the calculation result, a discharge controller 54F controls ink discharge from the liquid discharge head unit 210C for cyan. The discharge controller 54F outputs a second signal SIG2 to control the timing of ink discharge from the liquid discharge head unit 210C. When the timing of ink discharge from the liquid discharge head unit 210K is calculated, the discharge controller 54F outputs a first signal SIG1 to control the ink discharge from the liquid discharge head unit 210K. The discharge controller 54F is implemented by, for example, the controller 520 (illustrated in FIG. 2).

The liquid discharge apparatus according to the present embodiment can further includes a gauge such as an encoder. Descriptions are given below of a configuration including an encoder 300 serving as the gauge. For example, the encoder 300 is attached to a rotation shaft of the roller 230, which is a driving roller. Then, the encoder 300 can measure the amount of movement of the web 120 in the conveyance direction 10, based on the amount of rotation of the roller 230. When the measurement results are used in combination with the detection results generated by the sensor device SEN, the liquid discharge apparatus 110 can discharge liquid onto the web 120 more accurately.

For example, the correlation operation is performed as follows.

Example of Correlation Operation

Figure 9:
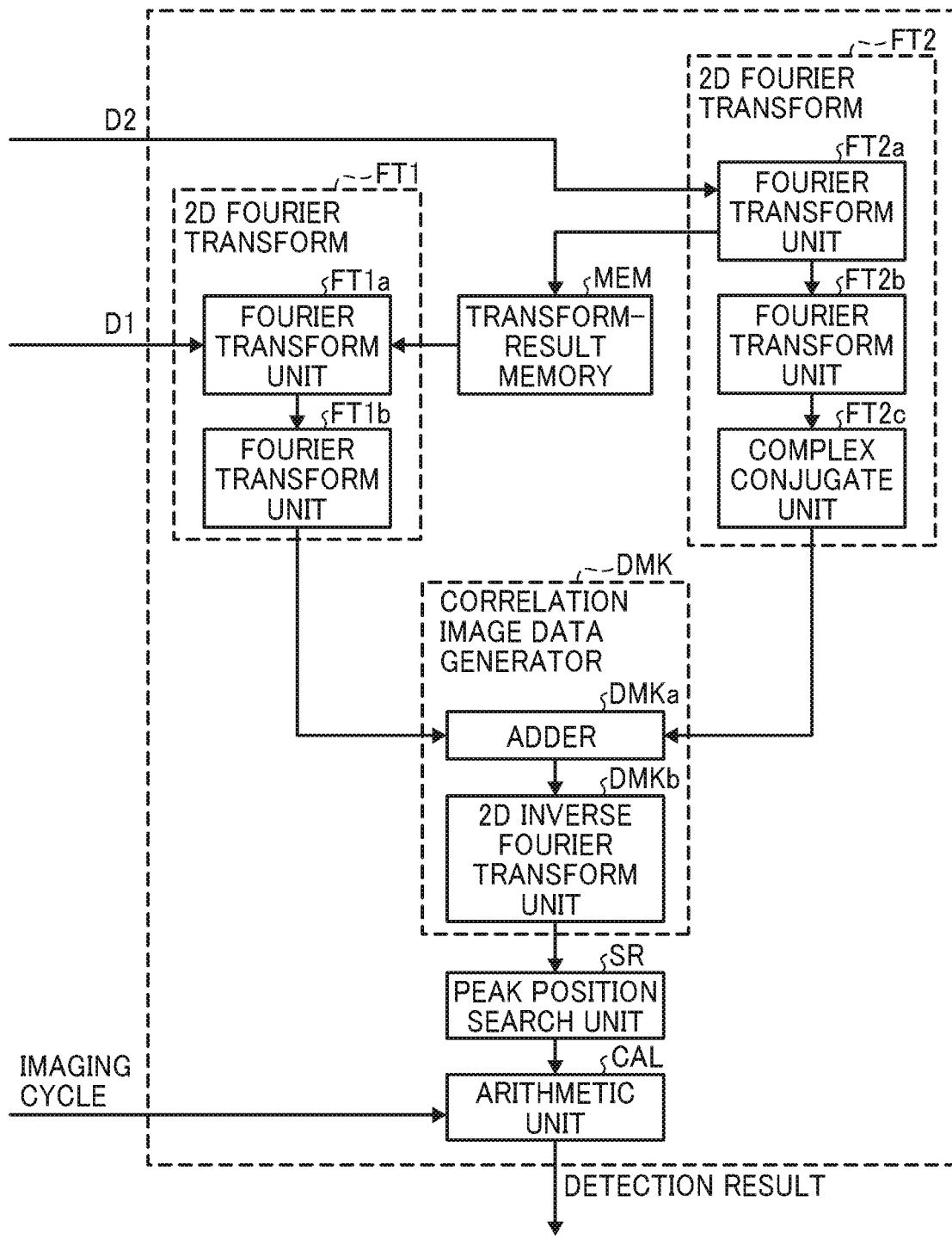
FIG. 9 is a diagram of a method of correlation operation according to an embodiment.

FIG. 9 is a diagram of a configuration for the correlation operation according to the present embodiment. For example, the calculator 53F performs the correlation operation with the illustrated configuration, to calculate the relative position of the web 120 in the orthogonal direction at the position where the image data is obtained, the amount of movement, speed of movement, or a combination thereof. Alternatively, with the correlation operation, the amount of displacement of the web 120 from the ideal position at the timing when the image data is obtained or the speed of displacement can be calculated.

Specifically, the calculator 53F includes a 2D Fourier transform FT1 (a first 2D Fourier transform), a 2D Fourier transform FT2 (second 2D Fourier transform), a correlation image data generator DMK, a peak position search unit SR, an arithmetic unit CAL (or arithmetic logical unit), and a transform-result memory MEM.

The 2D Fourier transform FT1 is configured to transform the first image data D1. The 2D Fourier transform FT1 includes a Fourier transform unit FT1a for transform in the orthogonal direction 20 and a Fourier transform unit FT1b for transform in the conveyance direction 10.

The Fourier transform unit FT1a performs one-dimensional transform of the first image data D1 in the orthogonal direction 20. Based on the result of transform by the Fourier transform unit FT1a for orthogonal direction, the Fourier transform unit FT1b performs one-dimensional transform of the first image data D1 in the conveyance direction 10. Thus, the Fourier transform unit FT1a and the Fourier transform unit FT1b perform one-dimensional transform in the orthogonal direction 20 and the conveyance direction 10, respectively. The 2D Fourier transform FT1 outputs the result of transform to the correlation image data generator DMK.

Similarly, the 2D Fourier transform FT2 is configured to transform the second image data D2. The 2D Fourier transform FT2 includes a Fourier transform unit FT2a for transform in the orthogonal direction 20, a Fourier transform unit FT2b for transform in the conveyance direction 10, and a complex conjugate unit FT2c.

The Fourier transform unit FT2a performs one-dimensional transform of the second image data D2 in the orthogonal direction 20. Based on the result of transform by the Fourier transform unit FT2a for orthogonal direction, the Fourier transform unit FT2b performs one-dimensional transform of the second image data D2 in the conveyance direction 10. Thus, the Fourier transform unit FT2a and the Fourier transform unit FT2b perform one-dimensional transform in the orthogonal direction 20 and the conveyance direction 10, respectively.

Subsequently, the complex conjugate unit FT2c calculates a complex conjugate of the results of transform by the Fourier transform unit FT2a (for orthogonal direction) and the Fourier transform unit FT2b (for conveyance direction). Then, the 2D Fourier transform FT2 outputs, to the correlation image data generator DMK, the complex conjugate calculated by the complex conjugate unit FT2c.

The correlation image data generator DMK then generates the correlation image data, based on the transform result of the first image data D1, output from the 2D Fourier transform FT1, and the transform result of the second image data D2, output from the 2D Fourier transform FT2.

The correlation image data generator DMK includes an adder DMKa and a 2D inverse Fourier transform unit DMKb.

The adder DMKa adds the transform result of the first image data D1 to that of the second image data D2 and outputs the result of addition to the 2D inverse Fourier transform unit DMKb.

The 2D inverse Fourier transform unit DMKb performs 2D inverse Fourier transform of the result generated by the adder DMKa. Thus, the correlation image data is generated through 2D inverse Fourier transform. The 2D inverse Fourier transform unit DMKb outputs the correlation image data to the peak position search unit SR.

The peak position search unit SR searches the correlation image data for a peak position (a peak luminance or peak value), at which rising is sharpest. To the correlation image data, values indicating the intensity of light, that is, the degree of luminance, are input. The luminance values are input in matrix.

Note that, in the correlation image data, the luminance values are arranged at a pixel pitch of the optical sensor OS (i.e., an area sensor), that is, pixel size intervals. Accordingly, the peak position is preferably searched for after performing so-called sub-pixel processing. Sub-pixel processing enhances the accuracy in searching for the peak position. Then, the calculator 53F can output the position, the amount of movement, and the speed of movement.

An example of searching by the peak position search unit SR is described below.

Figure 10:
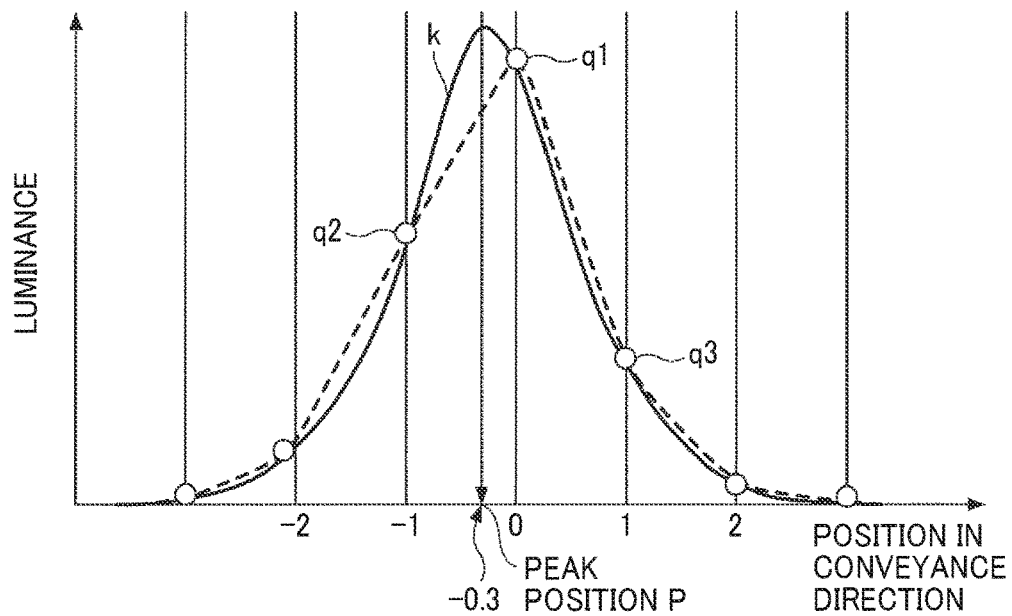
FIG. 10 is a graph for understanding of a peak position searched in the correlation operation illustrated in FIG. 14.

FIG. 10 is a graph illustrating the peak position searched in the correlation operation according to the present embodiment. In this graph, the lateral axis represents the position in the conveyance direction 10 of an image represented by the correlation image data, and the vertical axis represents the luminance values of the image represented by the correlation image data.

The luminance values indicated by the correlation image data are described below using a first data value q1, a second data value q2, and a third data value q3. In this example, the peak position search unit SR (illustrated in FIG. 9) searches for peak position P on a curved line k connecting the first, second, and third data values q1, q2, and q3.

Initially, the peak position search unit SR calculates each difference between the luminance values indicated by the correlation image data. Then, the peak position search unit SR extracts a largest difference combination, meaning a combination of luminance values between which the difference is largest among the calculated differences. Then, the peak position search unit SR extracts combinations of luminance values adjacent to the largest difference combination. Thus, the peak position search unit SR can extract three data values, such as the first, second, and third data values q1, q2, and q3 in the graph. The peak position search unit SR calculates the curved line K connecting these three data values, thereby obtaining the peak position P. In this manner, the peak position search unit SR can reduce the amount of operation such as sub-pixel processing to increase the speed of searching for the peak position P. The position of the combination of luminance values between which the difference is largest means the position at which rising is sharpest. The manner of sub-pixel processing is not limited to the description above.

Through the searching of the peak position P performed by the peak position search unit SR, for example, the following result is attained.

Figure 11:
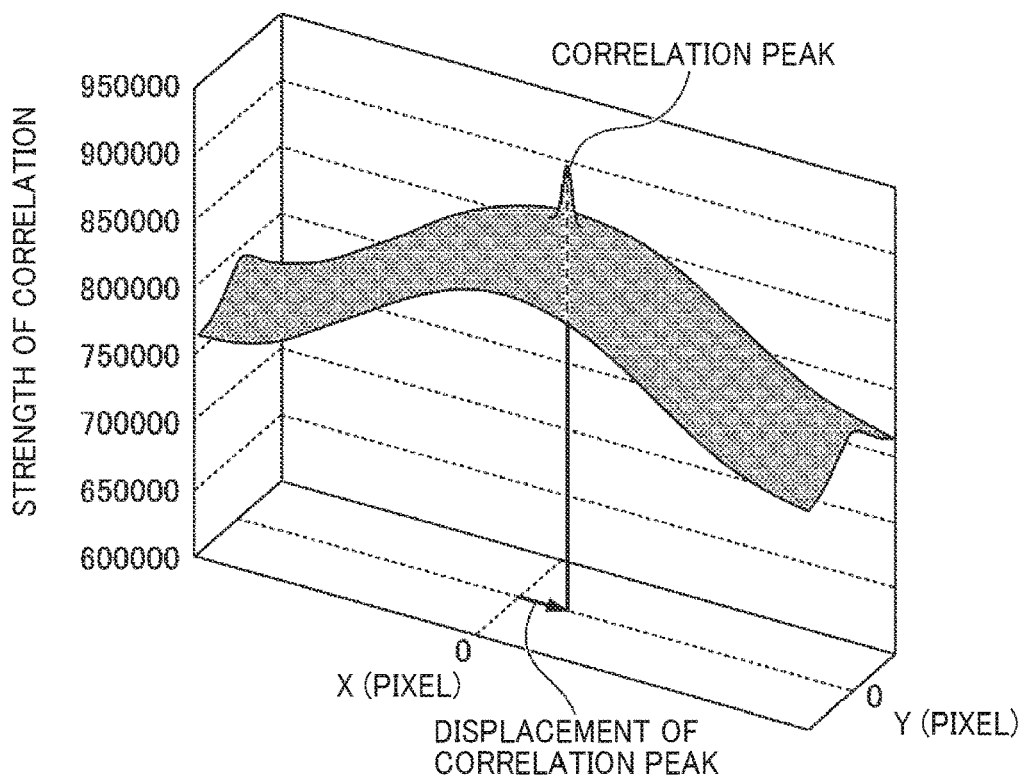
FIG. 11 is a diagram of example results of correlation operation according to an embodiment.

FIG. 11 is a diagram of example results of correlation operation and illustrates a profile of strength of correlation of a correlation function. In this drawing, X axis and Y axis represent serial number of pixel. The peak position search unit SR (illustrated in FIG. 9) searches for a peak position such as "correlation peak" in the graph.

Referring back to FIG. 9, the arithmetic unit CAL calculates the relative position, amount of movement, or speed of movement of the web 120, or a combination thereof. For example, the arithmetic unit CAL calculates the difference between a center position of the correlation image data and the peak position calculated by the peak position search unit SR, to obtain the relative position and the amount of movement.

For example, the arithmetic unit CAL divides the amount of movement by time, to obtain the speed of movement.

Thus, the calculator 53F can calculate, through the correlation operation, the relative position, amount of movement, or speed of movement of the web 120. The methods of calculation of the relative position, the amount of movement, or the speed of movement are not limited to those described above. For example, alternatively, the calculator 53F obtains the relative position, amount of movement, or speed of movement through the following method.

Initially, the calculator 53F binarizes each luminance value of the first image data D1 and the second image data D2. That is, the calculator 53F binarizes a luminance value not greater than a predetermined threshold into "0" and a luminance value grater than the threshold into "1". Then, the calculator 53F may compare the binarized first and second image data D1 and D2 to obtain the relative position.

Although the description above concerns a case where fluctuations are present in Y direction, the peak position occurs at a position displaced in the X direction when there are fluctuations in the X direction.

Alternatively, the calculator 53F can adapt a different method to obtain the relative position, amount of movement, or speed of movement. For example, the calculator 53F can adapt so-called pattern matching processing to detect the relative position based on a pattern taken in the image data.

Example of Occurrence of Displacement

Descriptions are given below of displacement of the recording medium in the orthogonal direction 20, with reference to FIGS. 12A and 12B, which are plan views of the web 120 being conveyed. In FIG. 12A, the web 120 is conveyed in the conveyance direction 10. While the web 120 is conveyed by the rollers (such as the rollers 230, CR1, and CR2 in FIG. 2), the position of the web 120 may fluctuate in the orthogonal direction 20 as illustrated in FIG. 12B. That is, the web 120 may meander as illustrated in FIG. 12B.

Note that, the roller is disposed oblique to the conveyance direction 10 in the illustrated example. In the drawing, the obliqueness is exaggerated, and the degree of obliqueness may be smaller than the degree illustrated.

The fluctuation of the position of the web 120 in the orthogonal direction 20 (hereinafter "orthogonal position of the web 120"), that is, the meandering of the web 120, is caused by eccentricity of a conveyance roller (the driving roller in particular), misalignment, or tearing of the web 120 by a blade. When the web 120 is relatively narrow in the orthogonal direction 20, for example, thermal expansion of the roller affect fluctuation of the web 120 in the orthogonal position.

For example, when vibration is caused by eccentricity of the roller or cutting with a blade, the web 120 can meander as illustrated. Additionally, when the cutting with the blade is uneven, meandering can be also caused by a physical property of the web 120, that is, the shape of the web 120 after the cutting.

Figure 13:
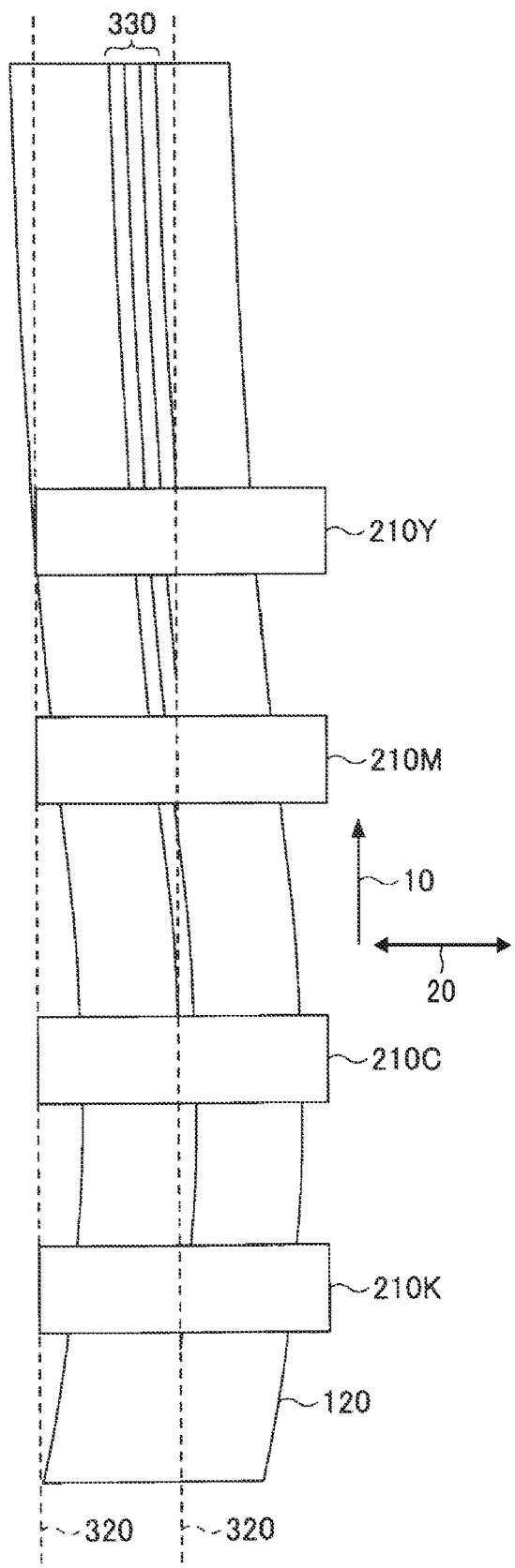
FIG. 13 is a plan view of the recording medium being conveyed and illustrates creation of an image out of color registration.

Descriptions are given below of a cause of misalignment in color superimposition (out of color registration) with reference to FIG. 13. Due to fluctuations (meandering illustrated in FIG. 12B) of the web 120 (the recording medium) in the orthogonal direction 20, misalignment in color superimposition is likely to occur as illustrated in FIG. 13.

Specifically, to form a multicolor image on the recording medium using a plurality of colors, the liquid discharge apparatus 110 superimposes a plurality of different color inks discharged from the liquid discharge head units 210, through so-called color plane, on the web 120.

As illustrated in FIG. 12B, the web 120 can fluctuate in position and meanders, for example, with reference to lines 320. Assuming that the liquid discharge head units 210 discharge respective inks to an identical portion (i.e., an intended droplet landing position) on the web 120 in this state, a portion 330 out of color registration is created since the intended droplet landing position fluctuates in the orthogonal direction 20 while the web 120 meanders between the liquid discharge head units 210. The portion 330 out of color registration is creased as the position of a line or the like, drawn by the respective inks discharged from the liquid discharge head units 210, shakes in the orthogonal direction 20. The portion 330 out of color registration degrades the quality of the image on the web 120.

[Controller]

The controller 520 is described below.

Figure 14:
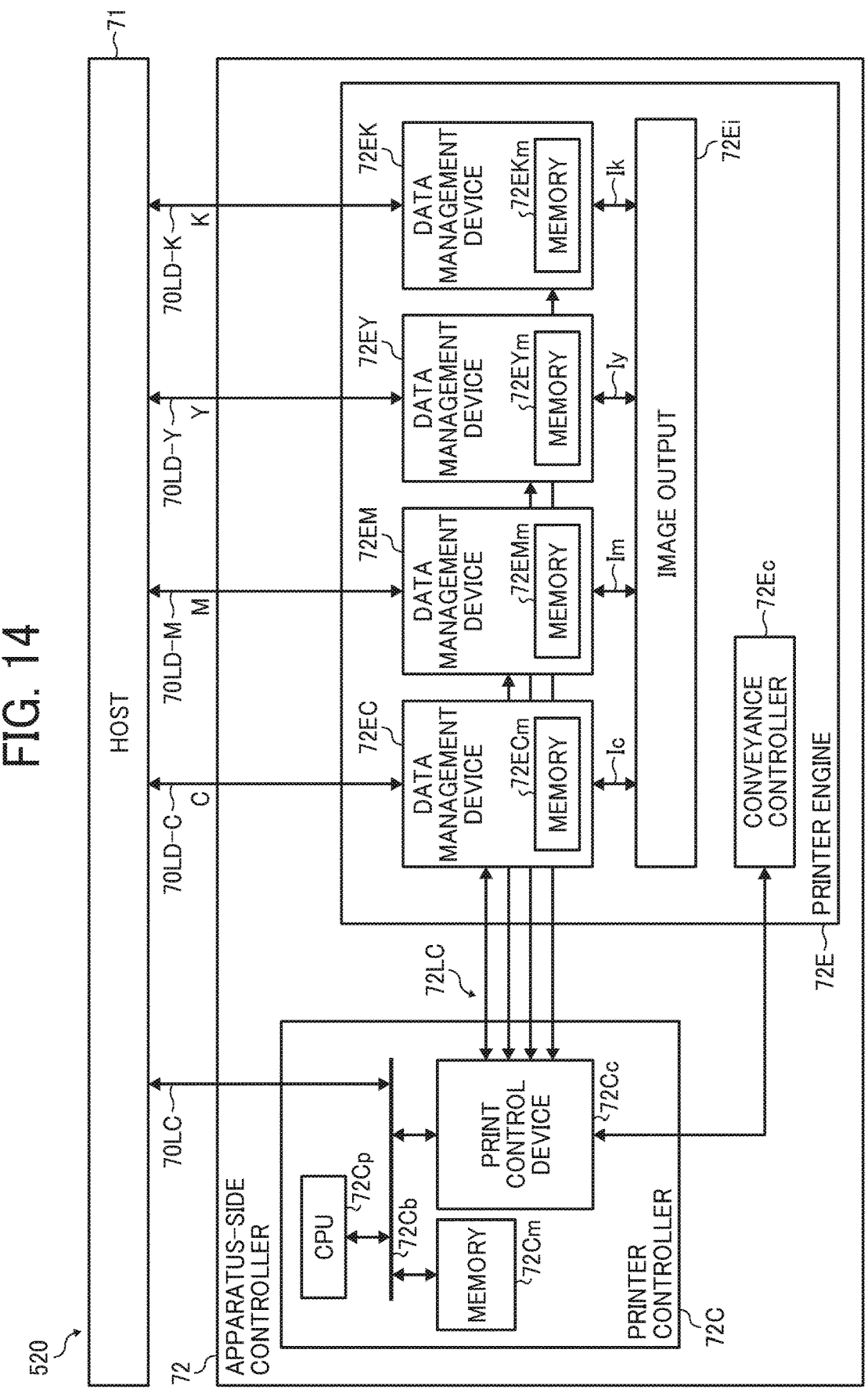
FIG. 14 is a schematic block diagram of a hardware configuration of a controller according to an embodiment.

FIG. 14 is a schematic block diagram of control configuration according to the present embodiment. For example, the controller 520 includes a host 71 (or a higher-order device), such as an information processing apparatus, and an apparatus-side controller 72. In the illustrated example, the controller 520 causes the apparatus-side controller 72 to form an image on a recording medium according to image data and control data input from the host 71.

Examples of the host 71 include a client computer (personal computer or PC) and a server. The apparatus-side controller 72 includes a printer controller 72C and a printer engine 72E.

The printer controller 72C governs operation of the printer engine 72E. The printer controller 72C transmits and receives the control data to and from the host 71 via a control line 70LC. The printer controller 72C further transmits and receives the control data to and from the printer engine 72E via a control line 72LC. Through such data transmission and reception, the control data indicating printing conditions and the like are input to the printer controller 72C. The printer controller 72C stores the printing conditions, for example, in a resistor. The printer controller 72C then controls the printer engine 72E according to the control data to form an image based on print job data, that is, the control data.

The printer controller 72C includes a central processing unit (CPU) 72Cp, a print control device 72Cc, and a memory 72Cm. The CPU 72Cp and the print control device 72Cc are connected to each other via a bus 72Cb to communicate with each other. The bus 72Cb is connected to the control line 70LC via a communication interface (I/F) or the like.

The CPU 72Cp controls the entire apparatus-side controller 72 based on a control program and the like. That is, the CPU 72Cp is a processor as well as a controller.

The print control device 72Cc transmits and receives data indicating a command or status to and from the printer engine 72E, based on the control date transmitted from the host 71. Thus, the print control device 72Cc controls the printer engine 72E.

To the printer engine 72E, a plurality of data lines, namely, data lines TOLD-C, TOLD-M, TOLD-Y, and TOLD-K are connected. The printer engine 72E receives the image data from the host 71 via the plurality of data lines. Then, the printer engine 72E performs image formation of respective colors, controlled by the printer controller 72C.

The printer engine 72E includes a plurality of data management devices, namely, data management devices 72EC, 72EM, 72EY, and 72EK. The printer engine 72E includes an image output 72Ei and a conveyance controller 72Ec.

Figure 15:
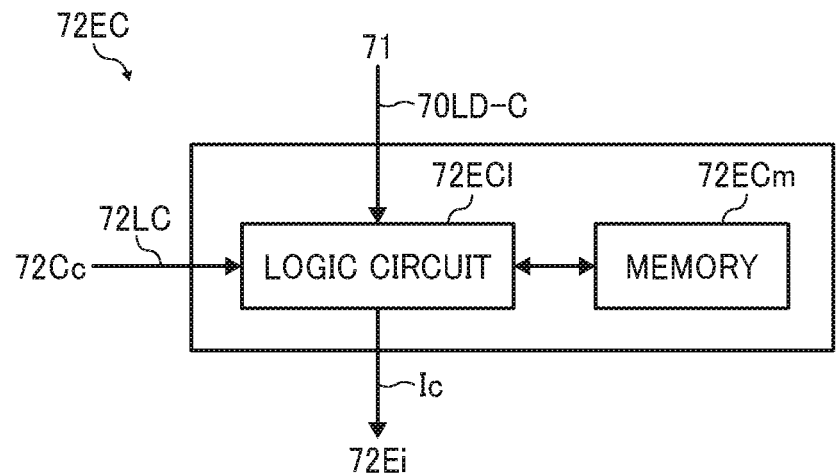
FIG. 15 is a block diagram of a hardware configuration of a data management unit of the controller illustrated in FIG. 9.

FIG. 15 is a block diagram of a configuration of the data management device 72EC. For example, the plurality of data management devices 72EC, 72EM, 72EY, and 72EK can have an identical configuration, and the data management device 72EC is described below as a representative. Redundant descriptions are omitted.

The data management device 72EC includes a logic circuit 72EC1 and a memory 72ECm. As illustrated in FIG. 15, the logic circuit 72EC1 is connected via a data line 70LD-C to the host 71. The logic circuit 72EC1 is connected via the control line 72LC to the print control device 72Cc. The logic circuit 72EC1 is implemented by, for example, an application specific integrated circuit (ASIC) or a programmable logic device (PLD).

According to a control signal input from the printer controller 72C (illustrated in FIG. 14), the logic circuit 72EC1 stores, in the memory 72ECm, the image data input from the host 71.

According to a control signal input from the printer controller 72C, the logic circuit 72EC1 retrieves, from the memory 72ECm, cyan image data Ic. The logic circuit 72EC1 then transmits the cyan image data Ic to the image output 72Ei. Similarly, magenta image data Im, yellow image data Iy, and black image data Ik are transmitted to the image output 72Ei.

The memory 72ECm preferably has a capacity to store image data extending about three pages. With the capacity to store image data extending about three pages, the memory 72ECm can store the image data input from the host 71, data image being used current image formation, and image data for subsequent image formation.

Figure 16:
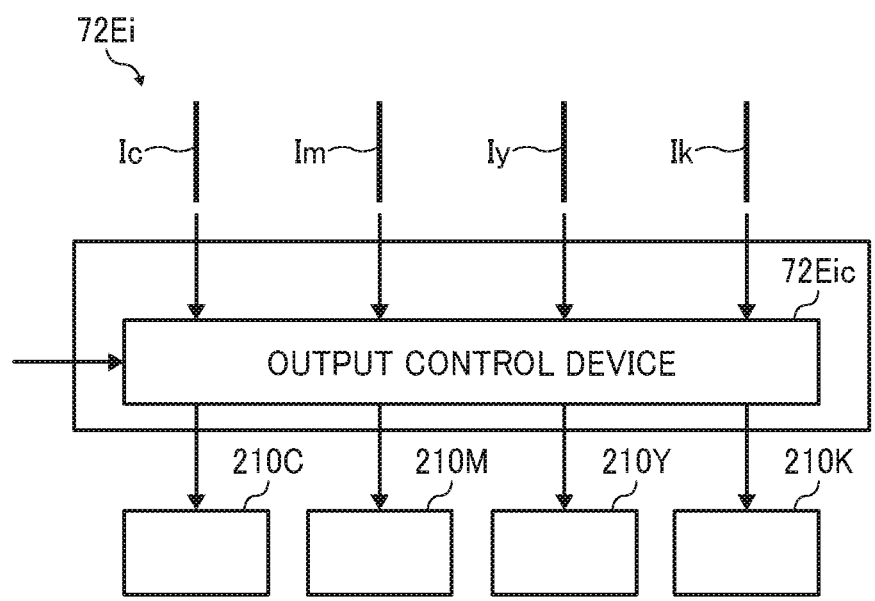
FIG. 16 is a block diagram of a hardware configuration of an image output device of the controller illustrated in FIG. 9.

FIG. 16 is a block diagram of a configuration of the image output 72Ei. In this block diagram, the image output 72Ei is constructed of an output control device 72Eic and the liquid discharge head units 210K, 210C, 210M, and 210Y.

The output control device 72Eic outputs the image data for respective colors to the liquid discharge head units 210. That is, the output control device 72Eic controls the liquid discharge head units 210 based on the image data input thereto.

The output control device 72Eic controls the plurality of liquid discharge head units 210 either simultaneously or individually. That is, the output control device 72Eic receives timing commands and changes the timings at which the liquid discharge head units 210 discharge respective color inks. The output control device 72Eic can control one or more of the liquid discharge head units 210 based on the control signal input from the printer controller 72C (illustrated in FIG. 14). Alternatively, the output control device 72Eic can control one or more of the liquid discharge head units 210 based on user instructions.

In the example illustrated in FIG. 14, the apparatus-side controller 72 has different routes for inputting the image data from the host 71 and for transmission and reception of control data, with the host 71 and the apparatus-side controller 72.

The apparatus-side controller 72 may instruct formation of single-color images using one color ink, for example, black ink. In the case of single-color image formation using black ink, to accelerate image formation speed, the liquid discharge apparatus 110 can include one data management device 72EK and four black liquid discharge head units 210K. In such as configuration, the plurality of black liquid discharge head units 210K discharge black ink. Accordingly, the image formation speed is faster than that in the configuration using one black liquid discharge head unit 210K.

The conveyance controller 72Ec (in FIG. 14) includes a motor and the like. For example, the conveyance controller 72Ec controls the motor coupled to the rollers to convey the web 120.

Example of setting of detection area for controlling liquid discharge position

Figure 17:
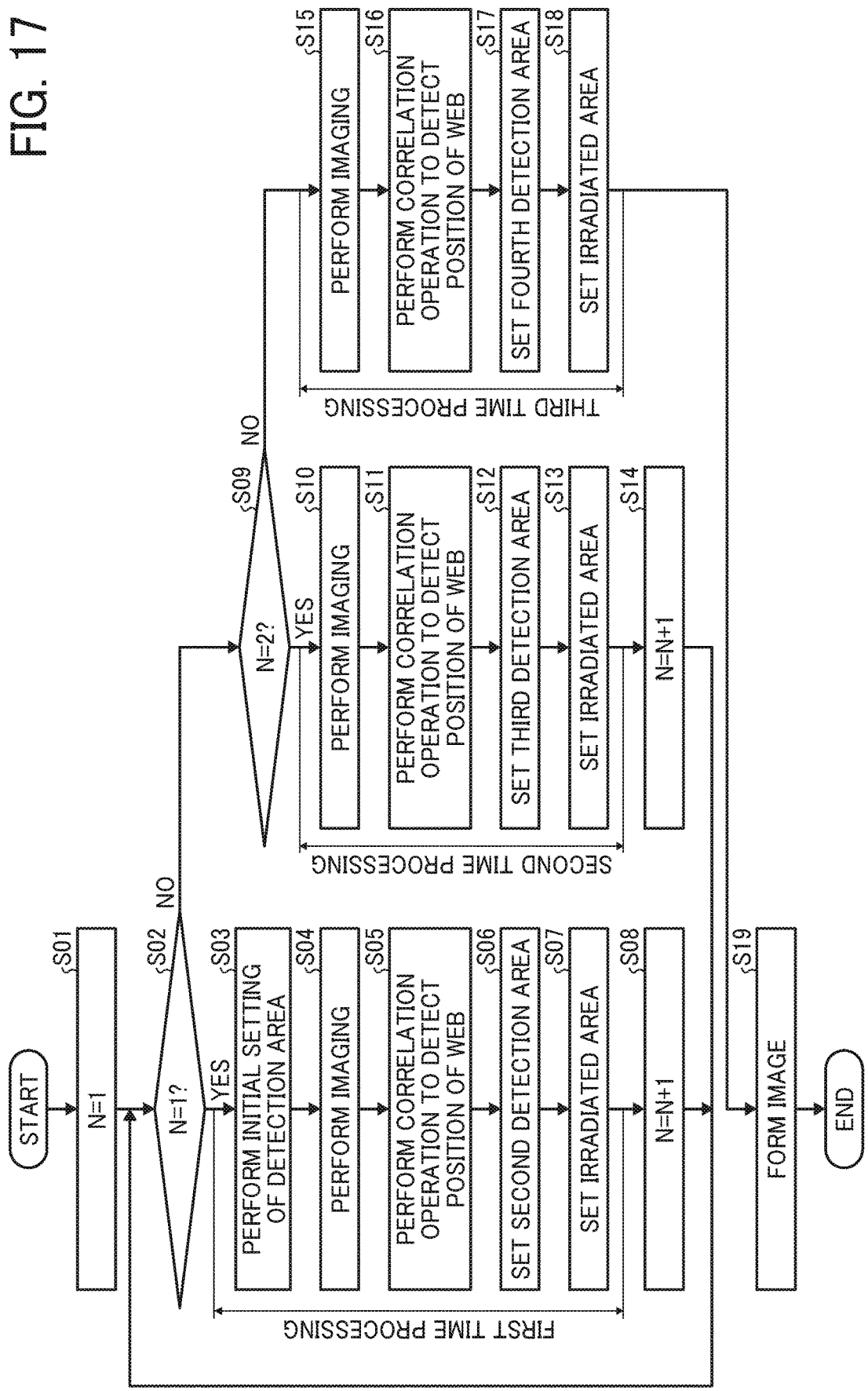
FIG. 17 is a flowchart of operation performed by the liquid discharge apparatus illustrated in FIG. 3.

FIG. 17 is a flowchart of operation performed by the liquid discharge apparatus 110 according to the present embodiment. The setting unit 58 illustrated in FIGS. 8A and 8B sets the detection area of the sensor device SEN in detecting the conveyed object, for controlling the liquid discharge position.

At S01, the liquid discharge apparatus 110 sets a counter value N to 1 (N=1), where the counter value N represents the number of times of processing including detection area setting and irradiated area setting. The counter value N being "1" is an example of an initial value. In the description below, the processing performed with the counter value N being "1" is referred to as first time processing, and the processing is performed three times (N=3).

At S02, the liquid discharge apparatus 110 determines whether the counter value N is "1" (N=1). When the counter value N is "1" (Yes at S02), the process proceeds to Step S03. When the counter value N is not "1", that is, the processing is not the first time (No at S02), the process proceeds to Step S09.

Figure 18:
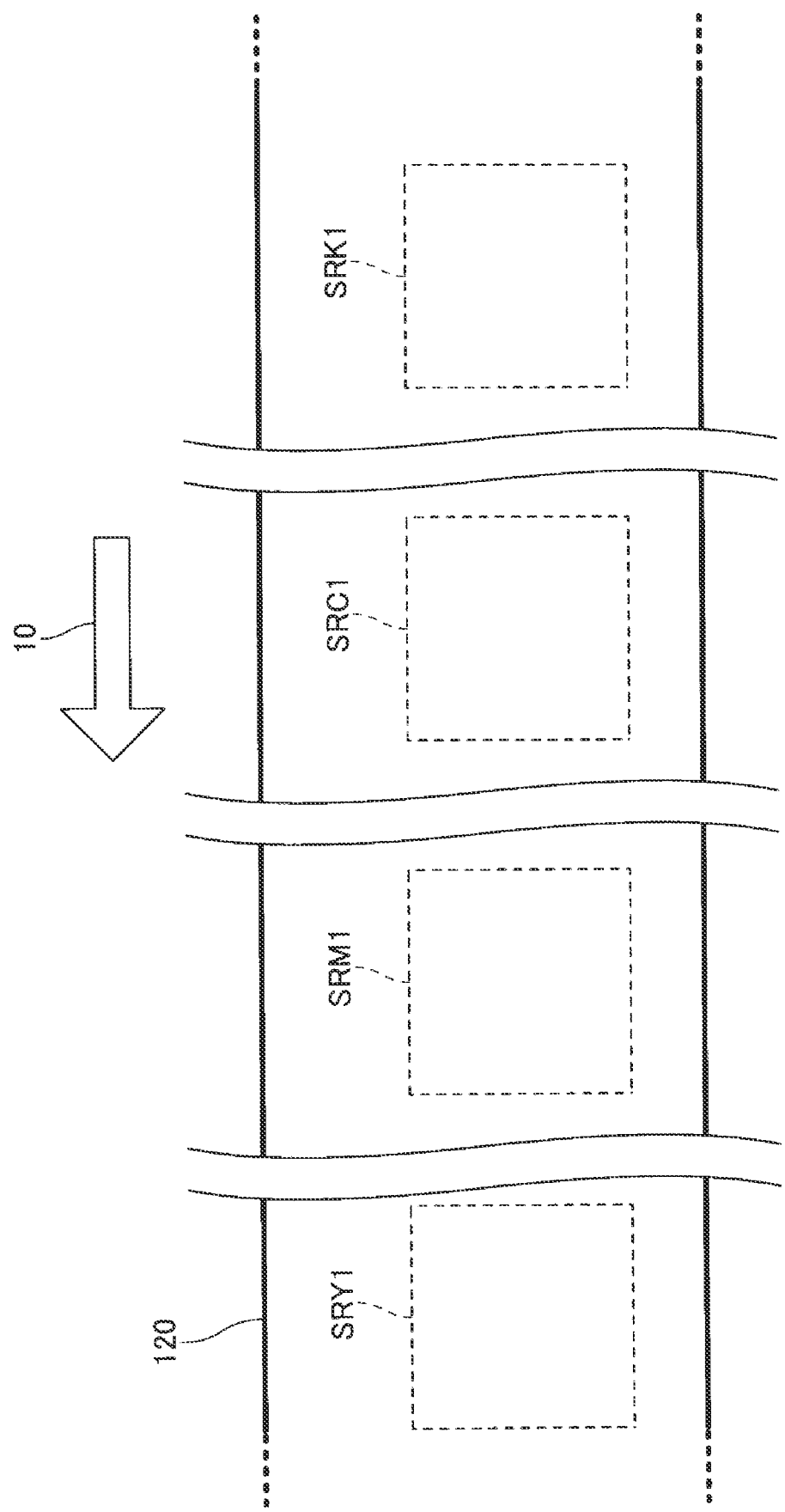
FIG. 18 illustrates an initial setting of a detection area detected by the liquid discharge apparatus, according to an embodiment.

At S03, the liquid discharge apparatus 110 sets a first detection area as initial setting of the detection area, for example, as illustrated in FIG. 18.

The initial setting is performed at S03 in FIG. 17, that is, before an image is formed on the web 120 according to image data.

In the illustrated example, the web 120 moves parallel to the conveyance direction 10 without skew and meandering and does not move in the orthogonal direction 20. That is, the illustrated state is free of the fluctuations illustrated in FIG. 12B.

In the liquid discharge apparatus 110 illustrated in FIG. 2, the first sensor devices SENK, SENC, SENM, and SENY perform the detection of the web 120. The area in which the conveyed object detector 600 performs the detection (i.e., the detection area) is, for example, a range in the image data in which the calculator 53F performs calculation. The detection area can be the range of the image data output from the imaging unit 16A. Alternatively, in a configuration in which the calculator 53F performs calculation in an area smaller than the entire area of the image data, the detection area is the area in which calculation is performed.

The liquid discharge apparatus 110 is configured to set the detection area, specifically, position, size, or both of the detection area in which the conveyed object detector 600 performs the detection. In the description below, the term "first detection area" represents the position, size, or both of the detection area set in the initial setting at S03.

Hereinafter, the term "first detection area SRK1" represents the area of calculation regarding the image data obtained by the sensor device SENK for black. Similarly, the term "first detection area SRC1" represents the area of calculation regarding the image data obtained by the sensor device SENC for cyan. The terms "first detection area SRM1" and "first detection area SRY1" represents the area of calculation regarding the image data obtained by the sensor device SENM for magenta and that regarding the image data obtained by the sensor device SENY for yellow, respectively.

Preferably, the first detection area is sufficiently large to cover the range of fluctuations in movement of the web 120 due to skew and meandering. For example, in a case where the web 120 is expected to fluctuate about ±1.0 mm in the orthogonal direction 20 due to skew or meandering thereof, the initial setting of the detection area (i.e., the first detection area) preferably have a size equal to or greater than 1.0 mm. When the first detection area is large enough to cover the potential fluctuation of the web 120, the liquid discharge apparatus 110 can detect the amount of movement of the web 120 even when the skew or meandering occurs.

Referring back to FIG. 17, at S04, the liquid discharge apparatus 110 performs imaging of the web 120, for example, as illustrated in FIG. 8A. Based on the imaging at S04, at S05, the liquid discharge apparatus 110 can calculate the detection result (i.e., a first detection result calculated using the detection area according to initial setting), such as the position of the web 120, through correlation operation and the like.

The detection of position at S05 can be implemented, for example, by the configuration illustrated in FIG. 9. The correlation operation is performed using the image data in the first detection areas SRK1, SRC1, SRM1, and SRY1 obtained at S04. In the description below, the detection area is the entire image data output from the imaging unit 16A or 16B.

Figure 19:
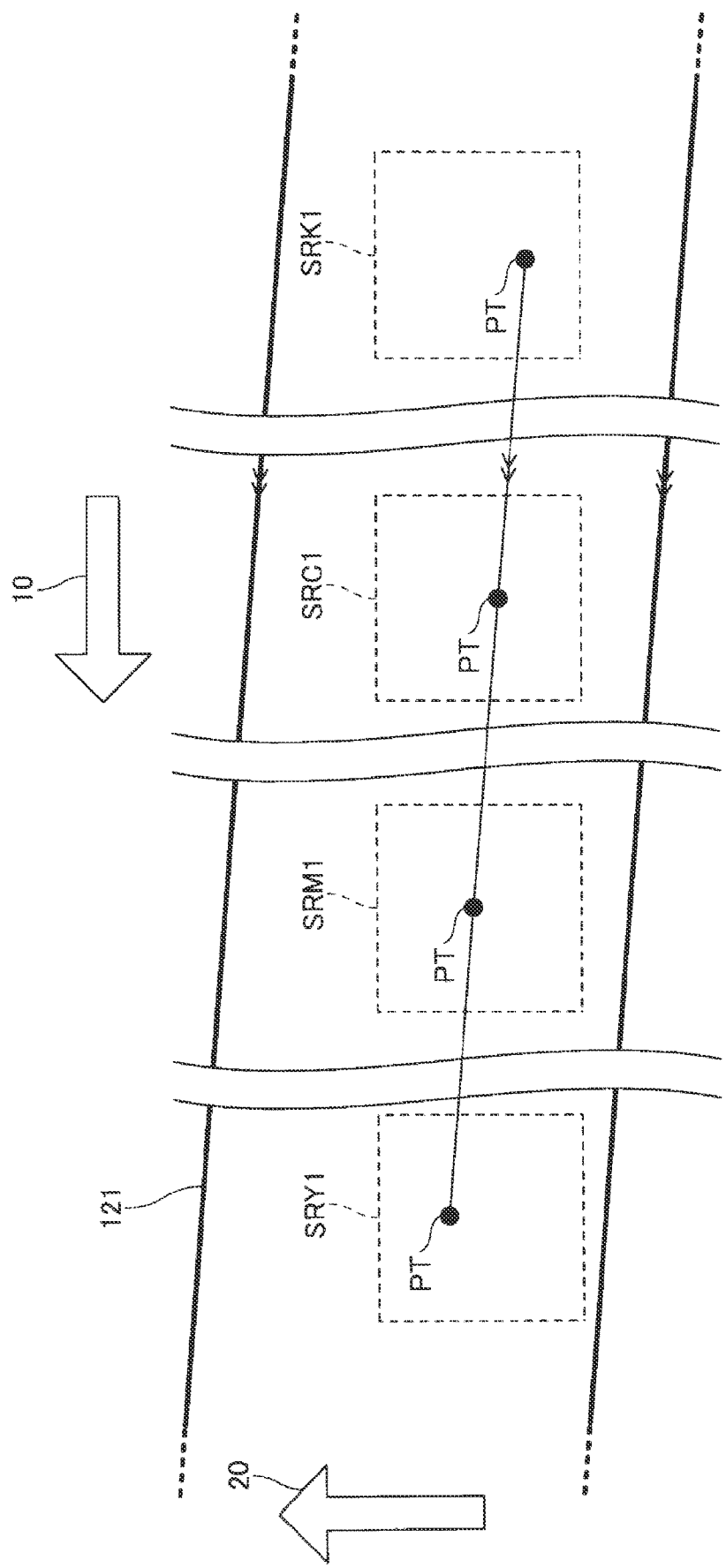
FIG. 19 illustrates an example of skew of the recording medium.

FIG. 19 illustrates an example of skew of the recording medium, which in the present embodiment is the web 120. Specifically, the web 120 is conveyed at an angle relative to the conveyance direction 10. Hereinafter, the web being in the illustrated state is referred to as a skew web 121.

It is assumed that, initially, a given position (hereinafter "detected position PT") is detected in the first detection area SRK1 of the sensor device SENK for black. After the detection in the first detection area SRK1, as the skew web 121 is conveyed in the conveyance direction 10, the detected position PT moves from the first detection area SRK1 for black to the first detection area SRC1 for cyan.

In the case of the skew web 121 illustrated in FIG. 19, the detected position PT in the first detection area SRC1 is shifted from the detected position PT in the first detection area SRK1 in the orthogonal direction 20.

The detected position PT may be different between the first detection area SRC1 and the first detection area SRK1 also in the conveyance direction 10.

Then, the liquid discharge apparatus 110 performs the correlation operation to locate the detected position PT in each of the first detection areas SRK1 and SRC1. Note that the detection result obtained here is, for example, an amount of deviation of color superimposed on a reference color or respective coordinate values in the first detection areas. Based on the detection result, the liquid discharge apparatus 110 can determine the degree of fluctuation of the position of the skew web 121 (i.e., the amount of displacement). Note that the position of the detected position PT can be detected multiple number of times to obtain the detection result. In other words, the detection result can be an average or moving average.

Referring back to FIG. 17, at S06, the setting unit 58 sets a second detection area. That is, the setting unit 58 changes the position, size, or range of the detection area from the initial setting (i.e., the first detection area). At S06, the setting unit 58 sets the second detection area for example, as illustrated in FIG. 20.

Figure 20:
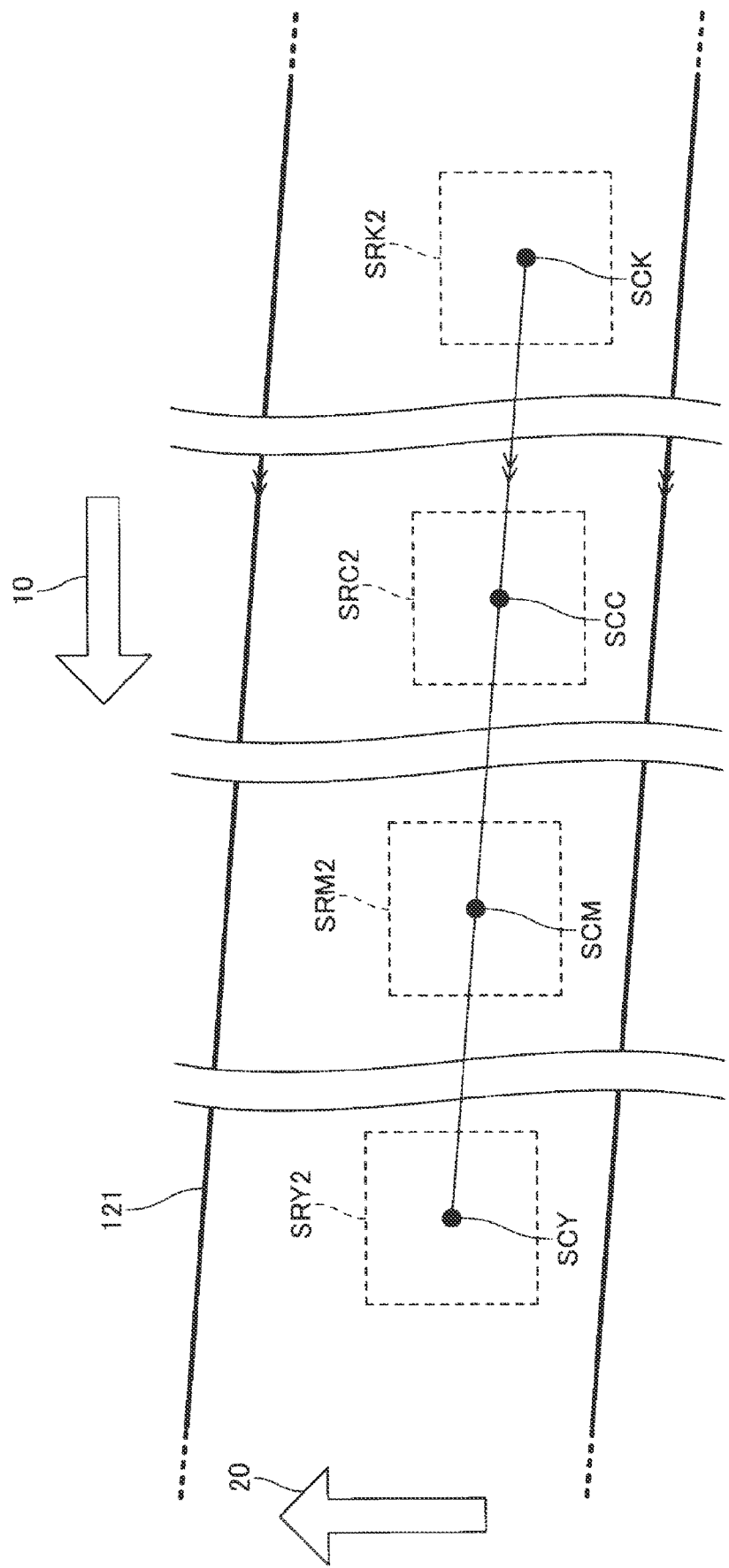
FIG. 20 illustrates setting of a second detection area by the liquid discharge apparatus, according to an embodiment.

Compared with FIG. 19, in FIG. 20, the first detection areas SRK1, SRC1, SRM1, and SRY1 are replaced with second detection areas SRK2, SRC2, SRM2, and SRY2.

The second detection area of the detection by the sensor device is preferably narrower than the first detection area. In this example, the liquid discharge apparatus 110 performs imaging in the second detection area reduced from the first detection area. Narrowing the detection area is advantageous in improving the accuracy in detecting the position of the detected position PT and improving the accuracy in detecting the amount of displacement of the web 120.

Additionally, respective center positions SCK, SCC, SCM, and SCY (also collectively "center positions SC") of the second detection areas SRK2, SRC2, SRM2, and SRY2 can be different from respective center positions of the first detection areas SRK1, SRC1, SRM1, and SRY1.

Specifically, the liquid discharge apparatus 110 sets the center position SC of each second detection area to the position defined by the result obtained by the correlation operation. Alternatively, the center position SC of the second detection area can different from the position defined by the result obtained by the correlation operation.

In this example, at S05, the liquid discharge apparatus 110 uses the detected position PT detected inside the first detection area SRK1 for black illustrated in FIG. 19, as the center position SCK for black. Similarly, at S05, the liquid discharge apparatus 110 uses the detected position PT detected inside the first detection area SRC1 for cyan, as the center position SCC for cyan. Similarly, the liquid discharge apparatus 110 uses the detected position PT detected inside the first detection area SRM1 and that detected inside the first detection area SRY1, as the center position SCC for magenta and the center position SCY for yellow, respectively.

Setting the center position SC as described above increase the probability that the detected position PT appears at or near the center of the image even in the case of the skew web 121. Accordingly, such setting increases the probability that the detected position PT at or near the center of the image.

As described above, the liquid discharge apparatus 110 sets the second detection area in accordance with the skew state of the skew web 121.

Figure 21:
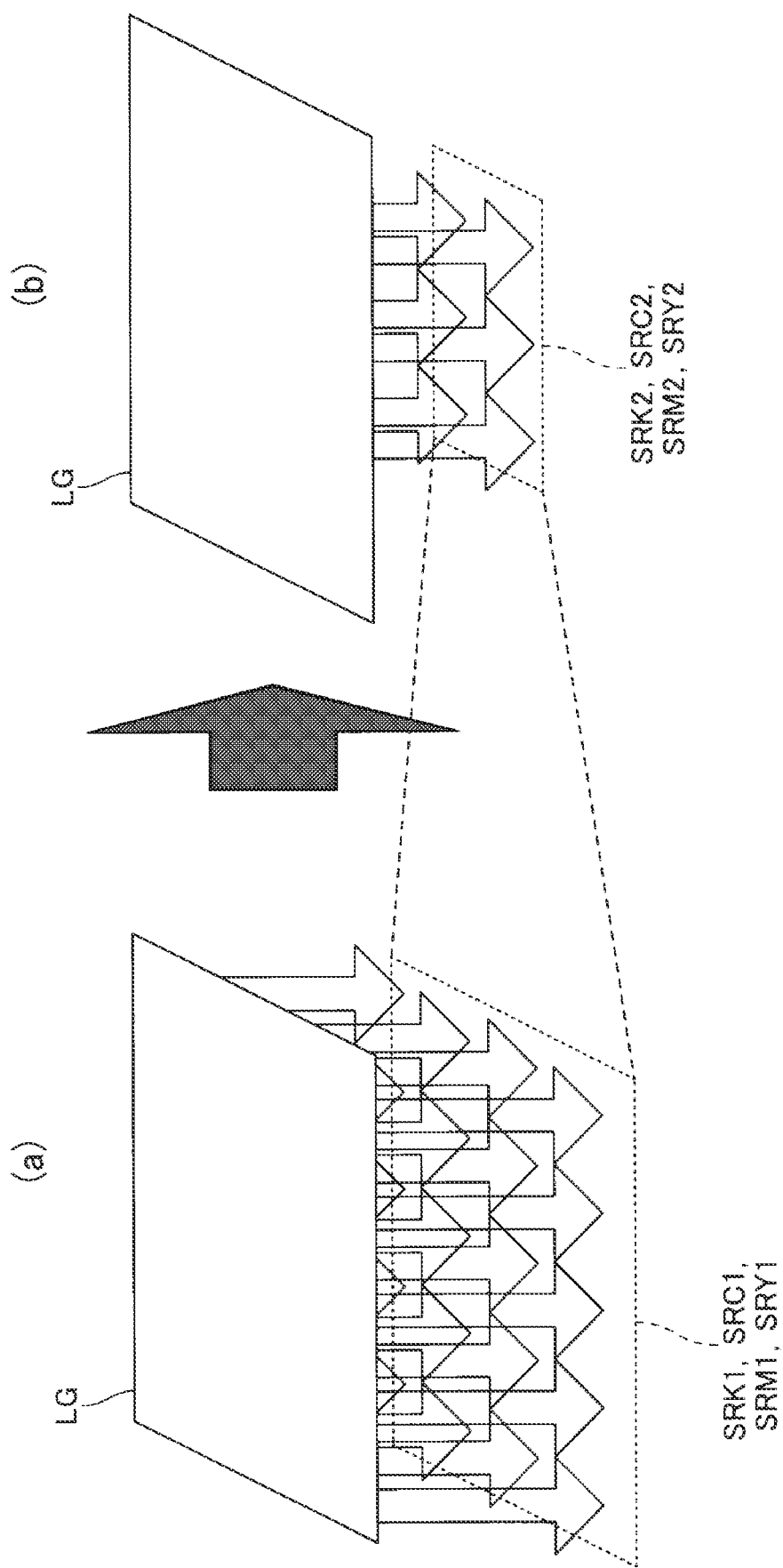
FIG. 21 illustrates setting of an irradiated area performed by the liquid discharge apparatus, according to an embodiment.

Referring back to FIG. 17, at S07, the control circuit 152 (in the hardware configuration illustrated in FIG. 6) sets the irradiated area in the web 120, irradiated by the light source LG, for example, as illustrated in FIG. 21. In the software configuration illustrated in FIG. 8A, the adjusting unit 55F controls the light source controller 56A (or 56B) to set the irradiated area.

The liquid discharge apparatus 110 includes the light source LG including a plurality of light-emitting elements. The term "irradiated area" represents the range of the web 120 irradiated with the light emitted from the light source LG.

Specifically, the light source LG includes a plurality of laser diodes arranged in the conveyance direction 10 and the orthogonal direction 20, and for example, evenly spaced. Accordingly, the light source LG preferably has a capability to individually turn on and off the plurality of laser diodes to change the size of the irradiated area. The light-emitting elements of the light source LG are preferably configured not to cancel a speckle generated by another one of the light-emitting elements. However, this limitation does not apply to a case where the surface data is not a speckle pattern.

In the initial setting, the liquid discharge apparatus 110 sets the irradiated area to accommodate the first detection area, that is, to include the first detection area SRK1, SRC1, SRM1, or SRY1 as illustrated in (a) in FIG. 21.

When the second detection area is set as illustrated in FIG. 20, the liquid discharge apparatus 110 changes the irradiated area in accordance therewith, to a range including the second detection area SRK2, SRC2, SRM2, or SRY2 as illustrated in (b) in FIG. 21 (at S07 in FIG. 17).

In the case where the first detection area is narrowed to the second detection area, the irradiated area is narrowed similarly. Since the irradiated area is narrowed, the light source LG can brighten the second detection area for imaging.

Referring back to FIG. 17, at S08, the liquid discharge apparatus 110 increments the counter value N by one (N=N+1, that is, N=2) and performs second time processing.

At S09, the liquid discharge apparatus 110 determines whether the counter value N is "2". When the counter value N is "2", that is, the processing including the detection area setting is second time (Yes at S09), the process proceeds to Step S10. When the counter value N is not "2", that is, the processing is not the second time (No at S09), the process proceeds to Step S15.

At S10, the liquid discharge apparatus performs imaging, for example, similar to S04.

At S11, the liquid discharge apparatus 110 calculates the detection result (i.e., a second detection result calculated using the second detection area according to the first detection result), such as the position of the web 120, through correlation operation and the like, for example, similar to S05.

Similar to the first time processing, in the second time processing and subsequent processing, the liquid discharge apparatus 110 detects the position through correlation operation based on the detection area as in Steps S10 and S11.

At S12, the setting unit 58 sets a third detection area. That is, the setting unit 58 changes the position, size, or range of the detection area from the first and second detection areas. At S12, the setting unit 58 sets the third detection area for example, as follows.

Figure 22:
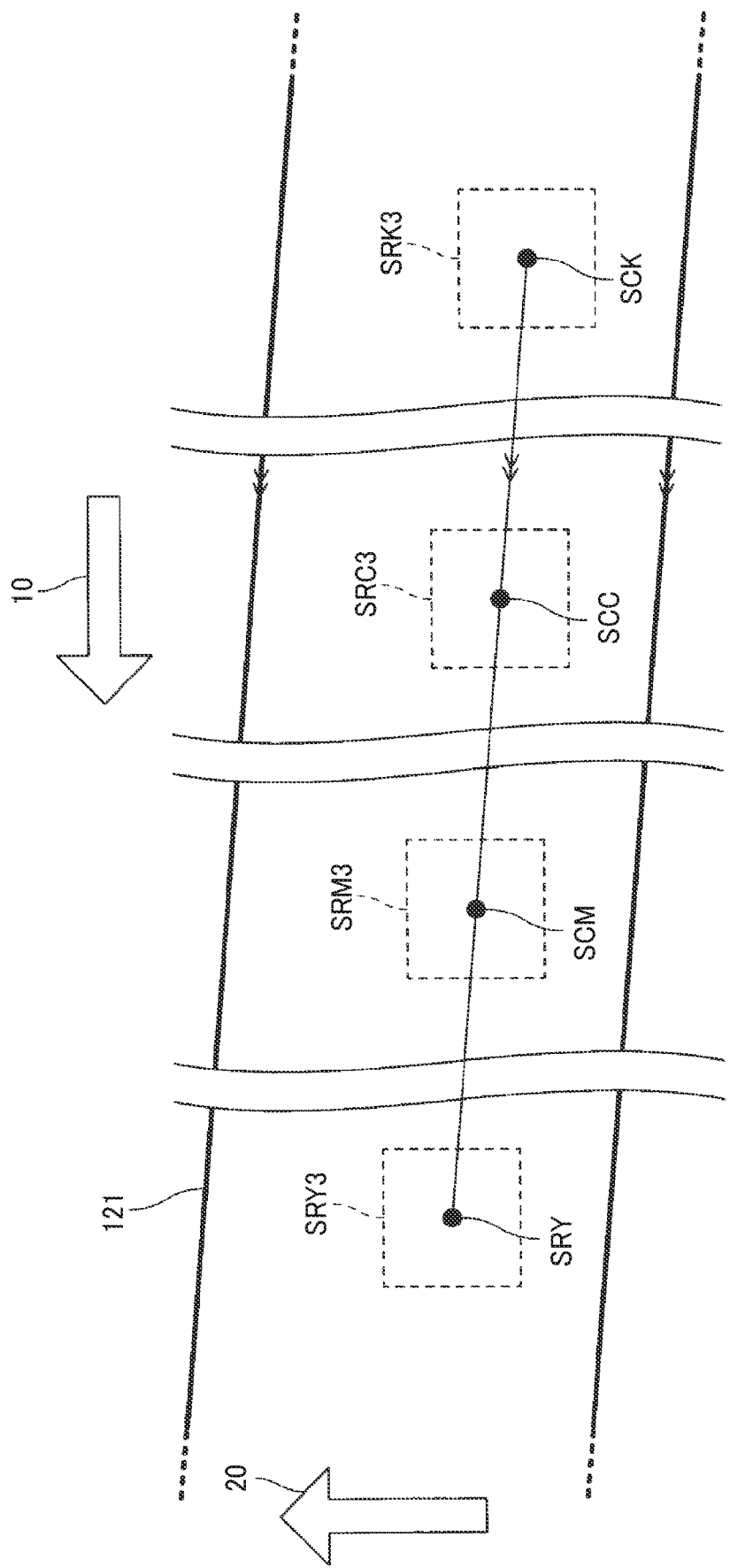
FIG. 22 illustrates setting of a third detection area by the liquid discharge apparatus, according to an embodiment.

With reference to FIG. 22, descriptions are given below of the setting of the third detection area by the liquid discharge apparatus 110 according to the present embodiment. Compared with FIG. 20, in FIG. 22, the second detection areas SRK2, SRC2, SRM2, and SRY2 are replaced with third detection areas SRK3, SRC3, SRM3, and SRY3.

The third detection area detected by the sensor device is preferably narrower than the second detection area. In this example, the liquid discharge apparatus 110 performs imaging in the third detection area reduced from the second detection area.

As described above, the liquid discharge apparatus 110 narrows the second detection area to the third detection area. Note that, the position can be changed in setting the third detection area.

Referring back to FIG. 17, at S13, the liquid discharge apparatus 110 sets the irradiated area, for example, similar to Step S07. The liquid discharge apparatus 110 sets the irradiated area in accordance with the size and position of the third detection area to include the third detection area.

[0C0]
At S14, the liquid discharge apparatus increments the counter value N by one (N=N+1) and sets the counter value N to "3". Then, the determination is "No" at S09, and the third time processing is performed.

At S15, the liquid discharge apparatus 110 performs imaging, for example, similar to S04.

At S16, the liquid discharge apparatus 110 detects the position of the web 120 through correlation operation and the like, for example, similar to S05.

At S17, the setting unit 58 sets a fourth detection area. That is, at S17, the setting unit 58 changes the position, size, or range of the detection area from that of the first to third detection areas. At S17, the setting unit 58 sets the fourth detection area for example, illustrated in FIG. 23.

Figure 23:
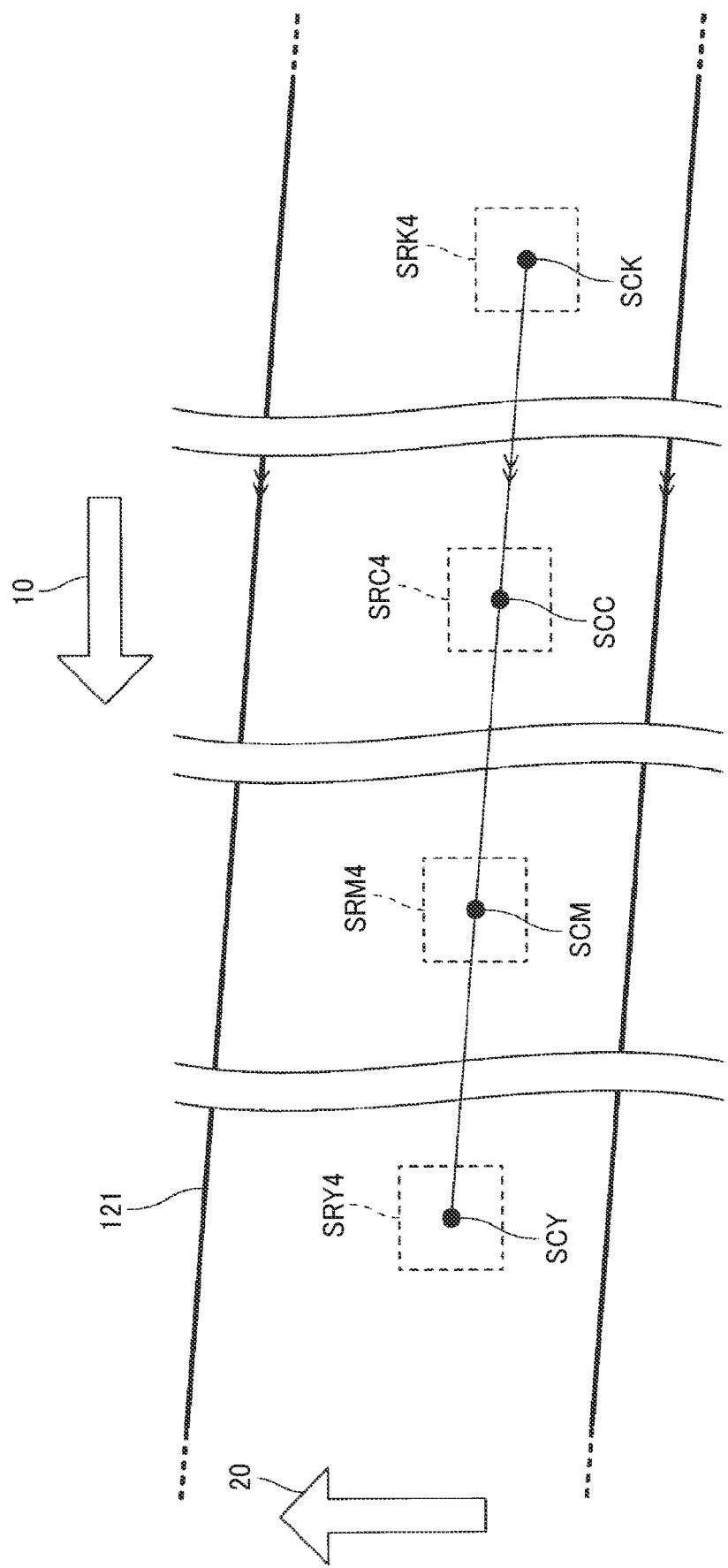
FIG. 23 illustrates setting of a fourth detection area by the liquid discharge apparatus, according to an embodiment.

Compared with FIG. 22, in FIG. 23, the third detection areas SRK3, SRC3, SRM3, and SRY3 are replaced with fourth detection areas SRK4, SRC4, SRM4, and SRY4.

The fourth detection area is preferably set so that the area used in detection by the sensor device is narrower than the third detection area. In this example, the liquid discharge apparatus 110 reduces the image size of the fourth detection area from the image size of the third detection area.

As described above, the liquid discharge apparatus 110 narrows the third detection area to the fourth detection area. Note that, in setting the fourth detection area, the position can be changed.

Referring back to FIG. 17, at S18, the liquid discharge apparatus 110 sets the irradiated area, for example, similar to Step S07. The liquid discharge apparatus 110 sets the irradiated area in accordance with the size and position of the fourth detection area to include the fourth detection area.

As described above, setting of the detection areas and the like is performed in preparation before image formation is performed at S19.

Note that the timings of imaging at S04, S10, and S15 are not limited to those illustrated in FIG. 14. For example, the imaging may be performed periodically based on a predetermined period. Then, the liquid discharge apparatus 110 can perform the correlation operation at a predetermined timing based on the images taken periodically.

At S19, the liquid discharge apparatus 110 performs image formation. Then, the conveyed object detector 600 detects the pattern on the web 120, with the fourth detection area set in the third time processing, that is, last setting. Based on the result of detection of the pattern, the liquid discharge apparatus 110 adjusts the discharge position of liquid and then discharges the liquid. Such detection and adjustment of the discharge position are performed during a print job. To adjust the discharge position of liquid, based on the result of detection of the pattern, for example, the liquid discharge head unit 210 is moved, or the timing of discharge of liquid is adjusted. Specifically, the liquid discharge apparatus 110 calculates the amount of displacement of the web as follows and moves the liquid discharge head unit 210.

Note that the liquid discharge apparatus 110 performs the detection using the fourth detection area and adjustment of the discharge position also during image formation. For example, the detection using the fourth detection area and adjustment of the discharge position are performed periodically based on a predetermined period. This configuration is advantageous in that, even when the position of the web 120 fluctuates as illustrated in FIG. 12B, the liquid discharge apparatus 110 can detects the fluctuation of the web 120 and adjust the discharge position of liquid. Accordingly, the accuracy of the landing position of liquid can improve.

With the improved accuracy of landing position, the liquid discharge apparatus 110 can prevent the misalignment in color superimposition illustrated in FIG. 13 to improve image quality.

Figure 24:
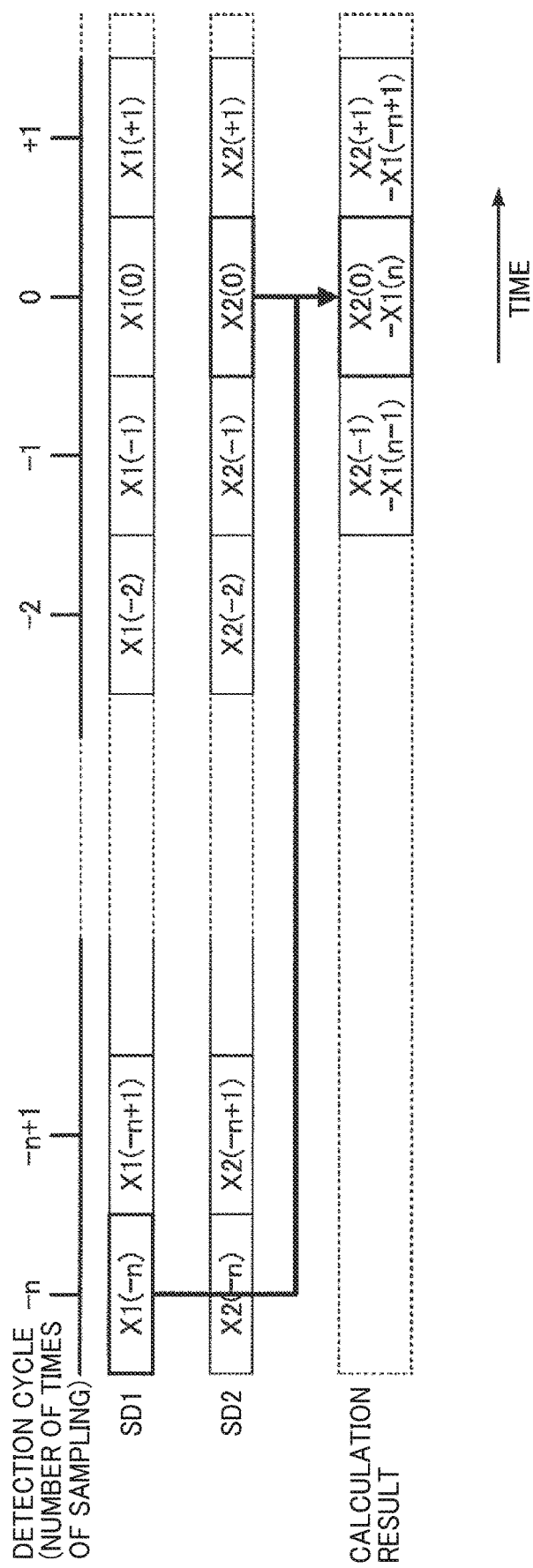
FIG. 24 is a timing chart of calculation of the amount of displacement of the conveyed object, according to an embodiment.

FIG. 24 is a timing chart of calculation of the amount of displacement of the conveyed object, performed by the liquid discharge apparatus 110 according to the present embodiment. As illustrated in FIG. 22, the calculator 53F (illustrated in FIG. 8A) calculates the amount of displacement of the web 120 based on the result of detection using the plurality of fourth detection areas. Specifically, the calculator 53F outputs the result of calculation indicating the displacement based on first and second detection results SD1 and SD2. In the illustrated example, the upstream sensor device outputs the first detection result SD1, and downstream sensor device outputs the second detection result SD2.

The amount of displacement is calculated for each liquid discharge head unit 210. Descriptions are given below of calculation of displacement of the web 120 for adjusting the cyan liquid discharge head unit 210C (illustrated in FIG. 2). In this example, the displacement of the web 120 is calculated based on the detection result generated by the sensor device SENC (illustrated in FIG. 2) and that by the sensor device SENK disposed upstream from and next to the sensor device SENC. In FIG. 24, the first detection result SD1 is generated by the sensor device SENK, and the second detection result SD2 is generated by the sensor device SENC.

When L2 represents the distance (interval) between the sensor device SENK and the sensor device SENC, V represents the conveyance speed detected by the speed detection circuit SCR, and T2 represents the time for the web 120 (conveyed object) to be conveyed from the sensor device SENK to the sensor device SENC, the time T2 is calculated as "T2=L2/V".

Further, when A represents a sampling interval of the sensor devices and n represents the number of times of sampling performed while the web 120 travels from the sensor device SENK to the sensor device SENC, the number of times of sampling "n" is calculated as "n=T2/A".

The calculation result is referred to as a displacement ΔX. For example, in a case of a detection cycle "0" in FIG. 24, the first detection result SD1 before the travel time T2 is compared with the second detection result SD2 at the detection cycle "0", to calculate the displacement ΔX of the web 120. This calculation is expressed as ΔX=X2(0)−X1(n). In the arrangement in which the position of the sensor device is between the liquid landing position and the first roller CR1, the liquid discharge apparatus 110 calculates an expected amount of displacement of the recording medium till the recording medium reaches the sensor device. Then, the liquid discharge apparatus 110 drives the actuator.

Subsequently, the liquid discharge apparatus 110 controls the second actuator AC2 (illustrated in FIG. 4) to move the liquid discharge head unit 210C (illustrated in FIG. 2) in the orthogonal direction 20, to compensate for the displacement ΔX. With this operation, even when the position of the conveyed object changes in the orthogonal direction 20, the liquid discharge apparatus 110 can form an image on the conveyed object with a high accuracy. Further, as the displacement is calculated based on the two detection results, that is, the detection results generated by the two different sensor devices, the displacement of the conveyed object can be calculated without multiplying the position data of the sensor devices. This operation can suppress the accumulation of detection errors by the sensor devices SN.

The amount of displacement can be calculated similarly for other liquid discharge head units 210. The first detection result SD1 generated by the second sensor device SEN2 (illustrated in FIG. 2) and the second detection result SD2 generated by the sensor device SENK are used to calculate the displacement of the web 120 for adjusting the black liquid discharge head unit 210K (illustrated in FIG. 2). The first detection result SD1 generated by the sensor device SENC and the second detection result SD2 generated by the sensor device SENM are used to calculate the displacement of the web 120 for adjusting the magenta liquid discharge head unit 210M (illustrated in FIG. 2). The first detection result SD1 generated by the sensor device SENM and the second detection result SD2 generated by the sensor device SENY are used to calculate the displacement of the web 120 for adjusting the yellow liquid discharge head unit 210Y (illustrated in FIG. 2).

The sensor device to generate the detection result SD1 is not limited to the sensor device SEN disposed next to and upstream from the liquid discharge head unit 210 to be moved. That is, the first detection result SD1 can be generated by any of the sensor devices disposed upstream from the liquid discharge head unit 210 to be moved. For example, any one of the second sensor device SEN2 and the sensor devices SENK and SENC can generate the first detection result SD1 to calculate the displacement of the web 120 for adjusting the yellow liquid discharge head unit 210Y.

By contrast, the second detection result SD2 is preferably generated by the sensor device SEN closest to the liquid discharge head unit 210 to be moved.

Alternatively, the displacement of the conveyed object can be calculated based on three or more detection results.

Based on the displacement of the web 120 thus calculated based on a plurality of detection results, the liquid discharge head unit 210 is moved, and the liquid is discharged onto the web 120 (i.e., the recording medium) to form an image thereon.

Referring back to FIG. 17, the detection area is preferably reduced stepwise from the initial setting, for example, in three steps. Note that the number of steps of reduction of the detection area (the largest value of the count value N) can be preset in the liquid discharge apparatus 110. The number of steps of reduction of the detection area is not limited to three. The image size to be set in each reduction of the detection area can be preset in the liquid discharge apparatus 110.

As described above, in the initial setting, the detection area is set to the first detection area that is a largest size detectable by the sensor device. In the first time processing, the detection area is set to the second detection area that is smaller than the first detection area and larger than the third detection area. In the second time processing, the detection area is set to the third detection area that is smaller than the second detection area and larger than the fourth detection area. At the last, in the third time processing, the detection area is set to the fourth detection area that is smaller than the third detection area, that is, smallest of the detection areas used. Gradually narrowing the detection area in such a manner is preferred.

For example, the first detection area is 2 mm in the conveyance direction 10 and 6 mm in the orthogonal direction 20. The fourth detection area is 1 mm in the conveyance direction 10 and 1 mm in the orthogonal direction 20. The length of the detection area in the conveyance direction 10 and that in the orthogonal direction 20 can be identical or different.

Alternatively, the fourth detection area can be 2 mm in the conveyance direction 10 and 2 mm in the orthogonal direction 20. Thus, the first detection area and the fourth detection area can be identical in length in the orthogonal direction 20.

The size of the detection area is preferably identical among the four colors. In other words, the respective images taken in the first detection areas SRK1, SRC1, SRM1, and SRY1 for black, cyan, magenta, and yellow are preferably identical in size. When the images are same in size, the processing such as the correlation operation is easier. Similarly, each of the second, third, and fourth detection areas is preferably identical among the four colors.

To set the detection area, for example, the amount of data read out from the sensor device is set, or a portion of the image output from the sensor device is cut out. The setting unit 58 (58A or 58b) is mounted in the imaging unit 16 as illustrated in FIG. 8A when the amount of data read out is set. Alternatively, the setting unit 58 is mounted in the imaging controller 14 as illustrated in FIG. 8B when the range of cutout is set. Narrowing the range of reading out from the sensor device is advantageous in reducing the data size read out from the sensor device. The amount of calculation by the calculator 53F can be reduced in the setting the detection area in any of the first time, second time, and third time processing.

As the detection area is changed, preferably the irradiated area is set in accordance with the detection area as set at S07, S13, and S18.

Specifically, in a case where the detection area is relatively large, the liquid discharge apparatus 110 may slow down the speed of conveyance of the web 120 in the conveyance direction 10. When the speed of conveyance is slow, the liquid discharge apparatus 110 can lower so-called frame rate to increase the period of imaging performed periodically. Generally, the duration of exposure can be made long when the frame rate is low.

Additionally, the frame rate is set in accordance with, for example, the speed of image formation. For example, the frame rate is set in a range from 50 to 800 frames per second (fps). When the speed of image formation is relatively fast, generally, the speed of conveyance of the web is slowed, and the frame rate is increased.

Further, at the first time, generally, the duration of exposure can be set long. Accordingly, in the imaging at the first time, generally a bright image can be obtained even under a relatively dark imaging condition. Therefore, in the first time processing, the intensity of light emitted from the light source LG is preferably reduced to avoid saturation of image due to the light.

By contrast, when the speed of conveyance is fast, preferably, the frame rate is preferably increased to increase the number of times of imaging performed per unit time. Generally, the duration of exposure is short when the frame rate is high. Accordingly, for example, in the fourth time imaging, the duration of exposure is shorter than that in the first time imaging. When the duration of exposure is short, the image obtained may be dark. Accordingly, in the second time processing and subsequent processing, the irradiated area is set (narrowed), for example, as illustrated in FIG. 21. Thus, the liquid discharge apparatus 110 narrows the irradiated area and increase the intensity of light. Under such a lighting condition, the liquid discharge apparatus 110 can obtain a bright image even when the duration of exposure is short.

[Variation]

Note that, alternatively, the detecting unit 110F10 can perform imaging twice with an identical sensor device and compare the images obtained by the first imaging and second imaging, to output the detection result indicating at least one of the position, speed of movement, and amount of movement of the web 120.

One or more of aspects of this disclosure can adapt to a conveyance system such as a liquid discharge system including at least one liquid discharge apparatus. For example, the liquid discharge head unit 210K and the liquid discharge head unit 210C are housed in one case as one apparatus, and the liquid discharge head unit 210M and the liquid discharge head unit 210Y are housed in another case as another apparatus. The liquid discharge system includes the two apparatuses.

Further, one or more of aspects of this disclosure can adapt to a liquid discharge system to discharge liquid other than ink. For example, the liquid is a recording liquid of another type or a fixing solution. In other words, aspects of this disclosure can adapt to a liquid discharge apparatus to discharge liquid other than ink and a system including such a liquid discharge apparatus.

The liquid discharge apparatus (or system) to which at least one aspect of this disclosure is applicable is not limited to apparatuses to form images. The articles produced can be, for example, a three-dimensional object (a 3D-fabricated object).

[Variation 1]

Note that, a single support can double as the first and second supports. An example configuration of the first and second supports is described below.

Figure 25:
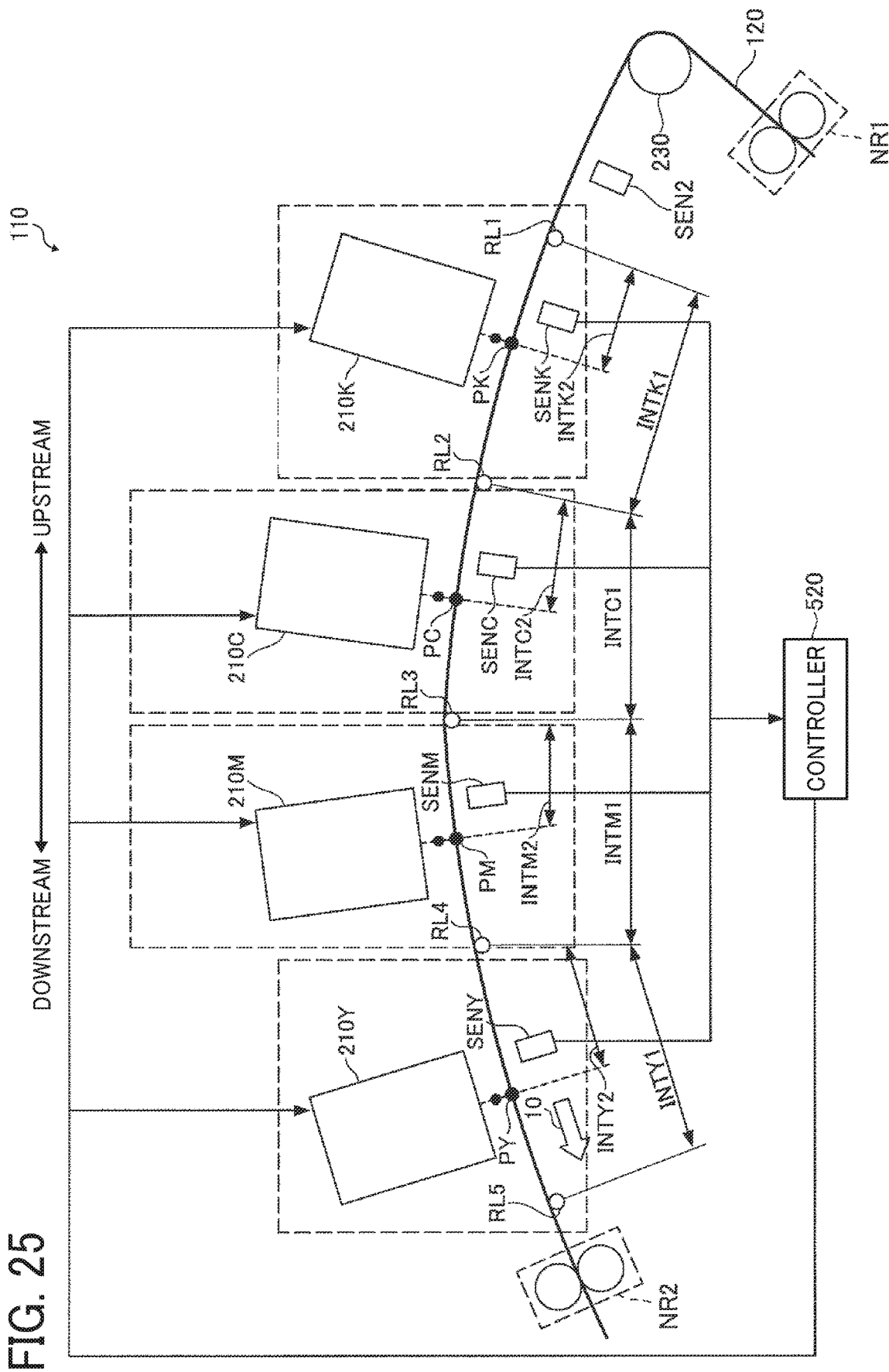
FIG. 25 is a schematic view of a liquid discharge apparatus according to Variation 1.

FIG. 25 is a schematic view of a liquid discharge apparatus according to Variation 1. This configuration differs from the configuration illustrated in FIG. 2 regarding the locations of the first support and the second support. As illustrated in this drawing, the liquid discharge apparatus 110 includes supports RL1, RL2, RL3, RL4, and RL5, serving as the first and second supports. In other words, one support can double as the second support (e.g., the conveyance roller CR2K in FIG. 2) disposed upstream from the downstream one of adjacent two liquid discharge head units and the first support (e.g., the conveyance roller CR1C in FIG. 2) disposed upstream from the upstream one of the adjacent two liquid discharge head units. Note that, the support according to the Variation, which doubles as the first and second supports, can be either a roller or a curved plate.

[Variation 2]

For example, the conveyance device according to this disclosure can be a device to perform operation, such as reading, relative to the conveyed object.

Figure 26:
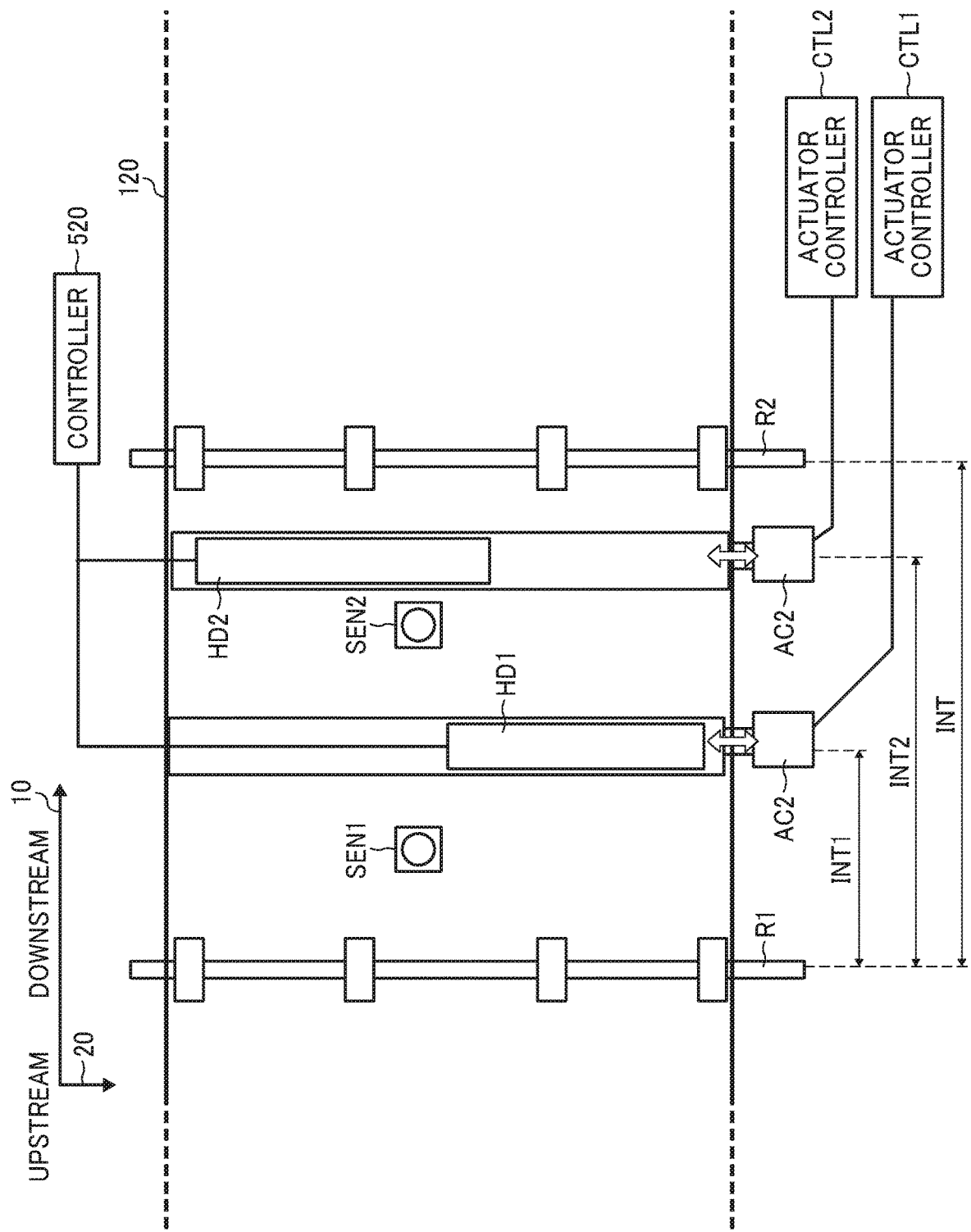
FIG. 26 is a schematic diagram of a conveyance device according to Variation 2.

FIG. 26 is a schematic diagram of a conveyance device according to Variation 2. In the example described below, the web 120 is conveyed from the left to the right in FIG. 26.

In this example, the conveyance device includes a head unit including a contact image sensor (CIS) head.

The head unit includes at least one CIS head. When head unit includes a plurality of CIS heads, the CIS heads are arranged in the orthogonal direction 20. In the illustrated example, the conveyance device includes two head units HD1 and HD2 (also collectively "head units HD"). The number of head units is not limited two but can be three or more.

As illustrated in FIG. 26, the head units HD1 and HD2 each include at least one CIS head. Although a description is made below of a configuration in which each head unit HD includes the one CIS head, alternatively, a plurality of CIS heads can be arranged in a zigzag manner, for example, with each two CIS heads staggered.

The head units HD and HD2 construct a scanner to read an image on the surface of the web 120 and output image data representing the image thus read. The conveyance device can combine pieces of image data output from the head units HD together to generate an image combined in the orthogonal direction 20.

The conveyance device illustrated in FIG. 26 includes the controller 520, and the actuator controllers CTL1 and CTL2. The controller 520 and the actuator controllers CTL1 and CTL2 are information processing apparatuses and, specifically, have hardware including a processor, a control device, a memory device, and an interface implemented by a CPU, an electric circuit, or a combination thereof. Note that the controller 520 and the actuator controllers CTL1 and CTL2 can be implemented by either a plurality of devices or a single device.

The head units are provided with the first sensor device SEN1 and the second sensor device SEN2 (also collectively "sensor devices SEN"), respectively. The conveyance device detects, with the sensor devices SEN, the surface data of the web 120 and detects at least one of the relative position, speed of movement, and the amount of movement of the web 120 among a plurality of detection results.

For the two head units HD1 and HD2, a plurality of rollers is provided. As illustrated in the drawing, for example, a first roller R1 and a second roller R2 are respectively disposed upstream and downstream from the two head units HD1 and HD2.

The sensor device SEN disposed in an inter-roller range INT between the first and second rollers R1 and R2 can detect the web 120 at a position close to the operation position. Since the moving speed is relatively stable in the inter-roller range INT, the conveyance device can accurately detect at least one of the relative position, speed of movement, and the amount of movement of the conveyed object among a plurality of detection results.

Preferably, in each inter-roller ranges INT1, the sensor device SEN is disposed closer to the first roller R1 than the operation position is. That is, preferably, the sensor device SEN performs the detection at a position upstream from the operation position of the head unit HD. In FIG. 26, the first sensor device SEN1 is preferably disposed between the operation position of the head unit HD and the first roller R1, that is, in a first upstream range INT1 in FIG. 26.

Similarly, the second sensor device SEN2 is preferably disposed between the operation position of the head unit HD2 and the first roller R1, that is, in a second upstream range INT2 in FIG. 26.

When the first and second sensor devices SEN1 and SEN2 are disposed in the first and second upstream ranges INT1 and INT2, respectively, the conveyance device can detect the conveyed object with a high accuracy. The sensor devices SEN disposed upstream from the operation position of the head unit HD can detect the surface data of the conveyed object at a position upstream from the operation position. Then, based on the detection result, the conveyance device can calculate the timing of operation by the head unit HD, the amount by which the head unit HD is to be moved, or both in at least one of the orthogonal direction 20 and the conveyance direction 10. In other words, in a period from when the position of a given portion of the web 120 (conveyed object) is detected on the upstream side to when the detected portion of the web 120 reaches the operation position, the operation timing is calculated or the head unit HD is moved. Therefore, the conveyance device can change the operation position with high accuracy.

If the sensor device SEN is disposed directly below the head unit HD, in some cases, depending on the calculation of operation timing or time for moving the head unit HD, the start of operation may be delayed. Accordingly, disposing the sensor device SEN upstream from the operation position can minimize the delay in operation of the head unit. Additionally, there may be a restriction on disposing the sensor device SEN adjacent to the operation position, that is, directly below the head unit HD. Accordingly, the location of sensor device is preferably closer to the first roller R1 than the operation position, that is, upstream from the ink operation position.

The web 120 may be irradiated with light in both of the operation by the head unit HD and detection by the sensor device SEN. In particular, when the web 120 has a high degree of transparency, the light for one of the operation and the detection may disturb the other. In such a case, disposing the sensor device SEN and the head unit HD on an identical optical axis is undesirable.

By contrast, when the transparency of the web 120 is lower, the sensor device SEN can be directly below the head unit HD. In the illustrated example, the position directly below the head unit HD is on the back side of the operation position. In other words, in some cases, the operation position and the location of sensor device are almost identical in the conveyance direction 10, and the operation is made on one side (e.g., front side) of the web 120 and the other side of the web 120 (e.g., back side) is detected by the sensor device SEN.

The sensor device SEN disposed directly below the head unit HD can accurately detect the amount of movement of the conveyed object directly below the head unit HD. Therefore, in a case where the light for one of the operation and the detection does not disturb the other and the speed of control action is relatively fast, the sensor device SEN is preferably disposed closer to the position directly below the head unit HD. However, the location of sensor device is not limited to a position directly below the head unit HD, and similar calculation is feasible when the sensor device SEN is disposed otherwise.

Alternatively, in a configuration in which error is tolerable, the location of sensor device can be almost directly below the head unit HD, or downstream from the position directly below the head unit HD in the inter-roller range INT.

[Variation 3]

The liquid discharge apparatus 110 (or the conveyance device) can convey a belt as the conveyed object.

Figure 27:
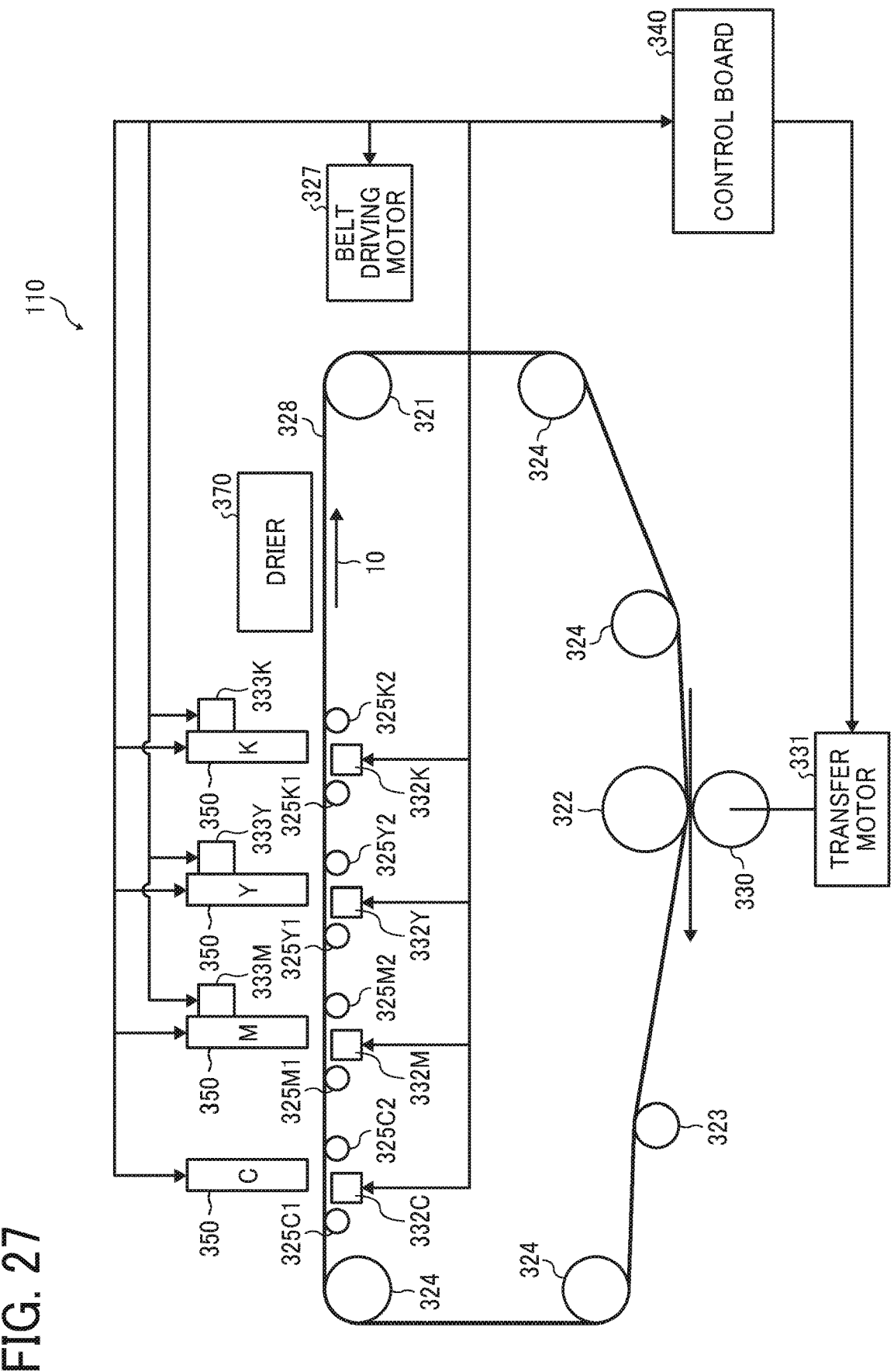
FIG. 27 is a schematic diagram of a liquid discharge apparatus according to Variation 3.

FIG. 27 is a schematic diagram of a liquid discharge apparatus according to Variation 3. In this example, head units 350C, 350M, 350Y, and 350K discharge ink droplets to form an image on the outer side of the loop of a transfer belt 328. The head units 350C, 350M, 350Y, and 350K are also collectively referred to as head units 350.

A drier 370 dries an image formed on the transfer belt 328 into a film.

Then, at a transfer position where the transfer belt 328 faces a transfer roller 360, the liquid discharge apparatus 110 transfers the image in the form of film, conveyed on the transfer belt 328, onto a sheet P.

Additionally, a cleaning roller 323 cleans the surface of the transfer belt 328 after the transfer.

In the liquid discharge apparatus 110 illustrated in FIG. 27, the head units 350C, 350M, 350Y, and 350K, the drier, the cleaning roller 323, and the transfer roller 360 are disposed around the transfer belt 328.

In this example, the transfer belt 328 is stretched taut around a driving roller 321, an opposing roller 322 (a transfer-backup roller), four shape-keeping rollers 324, and eight support rollers 325C1, 352C2, 325M1, 325M2, 325Y1, 325Y2, 325K1, and 325K2. As the driving roller 321 rotates driven by a belt driving motor 327, the transfer belt 328 rotates in the conveyance direction 10 indicated an arrow illustrated in FIG. 27.

The eight support rollers 325C1, 352C2, 325M1, 325M2, 325Y1, 325Y2, 325K1, and 325K2, disposed opposite the head units 350, keep the transfer belt 328 taut when the head units 350C, 350M, 350Y, and 350K discharge ink droplets. A transfer motor 331 drives the transfer roller 360.

Further, a sensor device 332C is disposed between the support rollers 325C1 and 325C2 and upstream from the ink discharge position of the head unit 350C in the conveyance direction 10 in which the transfer belt 328 rotates. The sensor device 332C includes a speckle sensor, which is an example to take an image of the surface of the transfer belt 328. Similar to the position of the sensor device 332C relative to the support rollers 325C1 and 325C2 and the head unit 350C, the sensor device 332M is disposed for the head unit 350M.

For the head units 350M, 350Y, and 350K, actuators 333M, 333Y, and 333K are provided, respectively. The actuator 333M moves the head unit 350M in the direction orthogonal to the conveyance direction 10 in which the transfer belt 328 rotates. Similarly, the actuators 333Y and 333K move the head units 350Y and 350K, respectively, in the direction orthogonal to the conveyance direction 10 in which the transfer belt 328 rotates.

A control board 340 detects the amount of movement of the transfer belt 328 in the direction orthogonal to the conveyance direction 10 and that in the conveyance direction, based on the image data obtained from the sensor devices 332C, 332M, 332Y, and 332K. Additionally, according to the amount of movement of the transfer belt 328 in the orthogonal direction, the control board 340 controls the actuators 333M, 333Y, and 333K to move the head units 350M, 350Y, and 350K in the orthogonal direction. Additionally, according to the amount of movement of the transfer belt 328 in the conveyance direction 10, the control board 340 controls the timing of liquid discharge from the head units 350M, 350Y, and 350K.

The control board 340 outputs driving signals to the belt driving motor 327 and the transfer motor 331.

Variation 3 can attain the following effects.

When the transfer belt 328 moves in the direction orthogonal to the direction in which the transfer belt 328 is driven by the driving roller 321 during driving of the transfer belt 328, the liquid discharge apparatus 110 can move the head units 350M, 350Y, and 350K in the orthogonal direction, corresponding to the amount of movement detected. Accordingly, the liquid discharge apparatus 110 can form a high-quality image on the transfer belt 328.

When the amount by which the transfer belt 328 rotates in the direction driven by the driving roller 321 is different from a supposed amount, the liquid discharge apparatus 110 can change the timing of liquid discharge from the head units 350M, 350Y, and 350K in response to the amount of rotation detected. Accordingly, the liquid discharge apparatus 110 can form a high-quality image on the transfer belt 328.

In the above-described example, the amount of movement of the transfer belt 328 in the direction orthogonal to the conveyance direction 10 and that in the conveyance direction are calculated based on the image data obtained from the sensor devices 332C, 332M, 332Y, and 332K. Alternatively, one of the amounts of movements can be calculated.

Although the head unit 350C does not includes an actuator in the above-described example, alternatively, an actuator can be provided. Then, the head unit 350C is moved in the direction orthogonal to the conveyance direction 10, thereby adjusting the position of the head unit 350C in the orthogonal direction at the time of image transfer from the transfer belt 328 onto the sheet P.

Although a plurality of head units is used to form an image on the transfer belt 328 in the example described above, alternatively, the operation described above can adopt to forming an image using one head unit.

The conveyed object is not limited to recording media such as paper sheets but can be any material to which liquid adheres, even temporarily. Examples of the material to which liquid adheres include paper, thread, fiber, cloth, leather, metal, plastic, glass, wood, ceramics, and a combination thereof.

Further, aspects of this disclosure can adapt to any apparatus to perform an operation or processing on a conveyed object, using a line head unit including heads lined in a direction orthogonal to the direction of conveyance of the conveyed object.

For example, aspects of this disclosure can adapt to a conveyance apparatus that conveys a substrate (conveyed object) and includes a laser head to perform laser patterning on the substrate. A plurality of such laser heads can be lined in the direction orthogonal to the direction of conveyance of the substrate. The conveyance device detects the position of the substrate and moves the head based on the detection result. In this case, the position at which the laser lands on the substrate is the operation position of the head.

The number of the head units is not necessarily to two or more. Aspects of this disclosure can adapt to a device configured to keep operation at to a reference position, on a conveyed object.

Further, one or more of aspects of this disclosure can be embodied as a method performed by a computer of a conveyance device, an information processing apparatus, or the combination thereof to cause the apparatus to discharge liquid, and at least a portion of the method can be implemented by a program.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A conveyance device comprising:
   a conveyor to convey a conveyed object in a conveyance direction;
   at least one head unit to perform an operation on the conveyed object;
   a sensor to obtain surface data in a region of the conveyed object, the sensor provided for each of the at least one head unit; and
   at least one processor configured to:
      calculate a first detection result including at least one of a position, a speed of movement, and an amount of movement of the conveyed object based on the surface data obtained by the sensor;
      set a detection area that is smaller than the region based on the first detection result,
      calculate a second detection result including at least one of the position, the speed of movement, and the amount of movement of the conveyed object, using the detection area according to the first detection result; and
      control the operation of the at least one head unit based on the second detection result.

2. The conveyance device according to claim 1, wherein the detection area is a range of the surface data to be used in calculation of the first detection result and the second detection result, and
   wherein the at least one processor is configured to set a center position of the detection area based on the first detection result.

3. The conveyance device according to claim 1, further comprising a light source to irradiate an area including the detection area,
   wherein the at least one processor is configured to set an irradiated area irradiated by the light source, based on first detection result and the second detection result.

4. The conveyance device according to claim 3, wherein the at least one processor is configured to set an intensity of light emitted from the light source.

5. The conveyance device according to claim 1, wherein the at least one processor is configured to set the detection area stepwise.

6. The conveyance device according to claim 1, further comprising:
   a first support disposed upstream from an operation position of each of the at least one head unit in the conveyance direction; and
   a second support disposed downstream from the operation position of each of the at least one head unit in the conveyance direction,
   wherein the sensor is disposed between the first support and the second support.

7. The conveyance device according to claim 6, wherein the sensor is disposed between each of the at least one head unit and the first support in the conveyance direction.

8. The conveyance device according claim 1, wherein the sensor is an optical sensor.

9. The conveyance device according to claim 1, wherein the surface data represents a pattern of the conveyed object.

10. The conveyance device according to claim 9, wherein, based on the surface data detected at two or more different time points, the at least one processor is configured to calculate the first detection result and the second detection result for each of the at least one head unit.

11. The conveyance device according to claim 9, wherein the pattern is generated by interference of light reflected on a rugged shape of the conveyed object, and
   wherein the at least one processor is configured to obtain the first detection result and the second detection result based on an image of the pattern, obtained by the sensor.

12. The conveyance device according to claim 1, wherein the at least one head unit includes a liquid discharge head to perform, as the operation, image formation on the conveyed object.

13. The conveyance device according to claim 1, wherein the conveyed object is a continuous sheet extending in the conveyance direction.

14. The conveyance device according to claim 1, further comprising a head moving device to move the at least one head unit,
   wherein the at least one processor is configured to control the head moving device based on the second detection result.

15. The conveyance device according to claim 1, wherein the at least one processor is configured to control timing of the operation performed by each of the at least one head unit based on the second detection result.

16. The conveyance device according to claim 15, further comprising a gauge to measure an amount of movement of the conveyed object,
   wherein the at least one processor is configured to control the at least one head unit based on the amount of movement measured by the gauge and the second detection result.

17. A conveyance system comprising:
   a plurality of conveyance devices each of which including:
      a conveyor to convey a conveyed object in a conveyance direction;
      at least one head unit to perform an operation on the conveyed object; and
      a sensor to obtain surface data in a region of the conveyed object, the sensor provided for each of the at least one head unit; and
   at least one processor configured to:
      calculate a first detection result including at least one of a position, a speed of movement, and an amount of movement of the conveyed object based on the surface data obtained by the sensor;
      set a detection area that is smaller than the region based on the first detection result,
      calculate a second detection result using the detection area according to the first detection result; and
      control operation of the at least one head unit based on the second detection result.

18. A method for controlling a head to perform an operation on a conveyed object, the method comprising:
   obtaining surface data in a region of the conveyed object;
   calculating a first detection result including at least one of a position, a speed of movement, and an amount of movement of the conveyed object based on the surface data;
   setting a detection area that is smaller than the region used based on the first detection result;
   calculating a second detection result including at least one of the position, the speed of movement, and the amount of movement of the conveyed object, using the detection area according to the first detection result; and
   controlling the operation of the head based on the second detection result.

* * * * *